(12) United States Patent
Horii

(10) Patent No.: US 9,077,976 B2
(45) Date of Patent: Jul. 7, 2015

(54) SINGLE-EYE STEREOSCOPIC IMAGE CAPTURING DEVICE

(71) Applicant: FUJIFILM Corporation, Minato-ku, Tokyo (JP)

(72) Inventor: Hirofumi Horii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 441 days.

(21) Appl. No.: 13/718,619

(22) Filed: Dec. 18, 2012

(65) Prior Publication Data

US 2013/0135449 A1 May 30, 2013

Related U.S. Application Data

(63) Continuation-in-part of application No. PCT/JP2011/064639, filed on Jun. 27, 2011.

(30) Foreign Application Priority Data

Jun. 29, 2010 (JP) ................................. 2010-147889

(51) Int. Cl.
*H04N 13/02* (2006.01)
*H04N 15/00* (2006.01)
*G03B 35/10* (2006.01)

(52) U.S. Cl.
CPC ............ *H04N 13/0207* (2013.01); *G03B 35/10* (2013.01); *H04N 13/0225* (2013.01); *H04N 13/0235* (2013.01); *H04N 13/0271* (2013.01); *H04N 13/0296* (2013.01)

(58) Field of Classification Search
None
See application file for complete search history.

(56) References Cited

U.S. PATENT DOCUMENTS

| | | | | |
|---|---|---|---|---|
| 5,142,357 | A * | 8/1992 | Lipton et al. | 348/48 |
| 6,233,003 | B1 | 5/2001 | Ono | |
| 2011/0025829 | A1* | 2/2011 | McNamer et al. | 348/50 |
| 2012/0098938 | A1* | 4/2012 | Jin | 348/47 |
| 2013/0201298 | A1* | 8/2013 | Laudo et al. | 348/49 |

FOREIGN PATENT DOCUMENTS

| | | |
|---|---|---|
| JP | 10-042314 A | 2/1998 |
| JP | 2002-090921 A | 3/2002 |
| JP | 2003-107601 A | 4/2003 |
| JP | 2006-105771 A | 4/2006 |

OTHER PUBLICATIONS

International Search Report and Written Opinion of PCT/JP2011/064639 dated Sep. 13, 2011, 5 pages total in Japanese and English.

* cited by examiner

*Primary Examiner* — Joseph Ustaris
*Assistant Examiner* — Kevin McInnish
(74) *Attorney, Agent, or Firm* — Sughrue Mion, PLLC

(57) ABSTRACT

Present invention provides a single-eye stereoscopic image capturing device which can reduce the discomfort of a photographer by constantly maintaining a parallax quantity of a left-eye image and a right-eye image that are stereoscopically-displayed even if a focus lens is moved. The single-eye stereoscopic image capturing device comprises, a photographic optical system, pupil division part, imaging part, focus lens driving part, parallax correction quantity calculation part, parallax correction part, and output part.

20 Claims, 25 Drawing Sheets (MAIN PIXEL)

(SUB-PIXEL)

NORMAL PIXEL

PHASE DIFFERENCE PIXEL

PHASE DIFFERENCE PIXEL

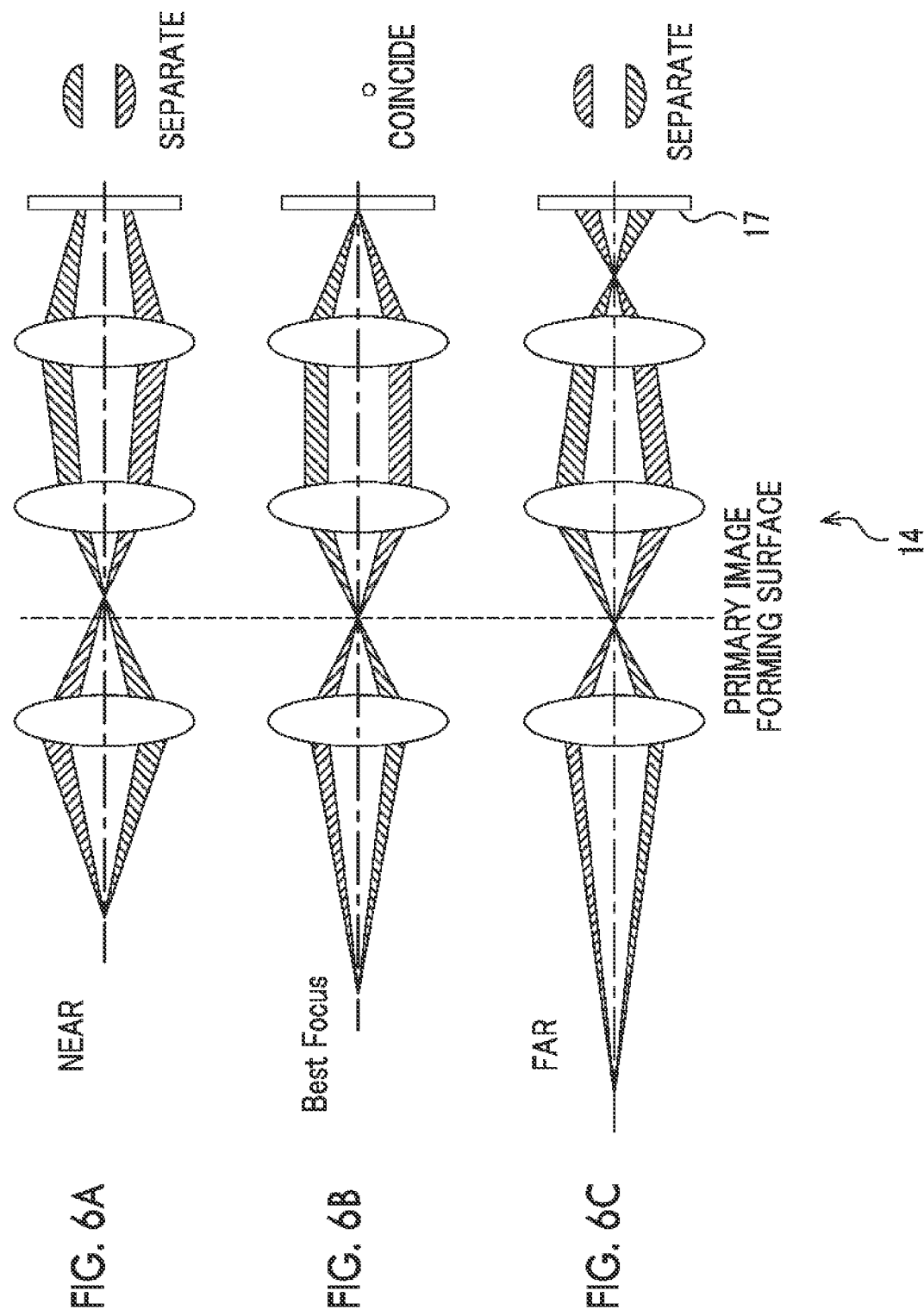

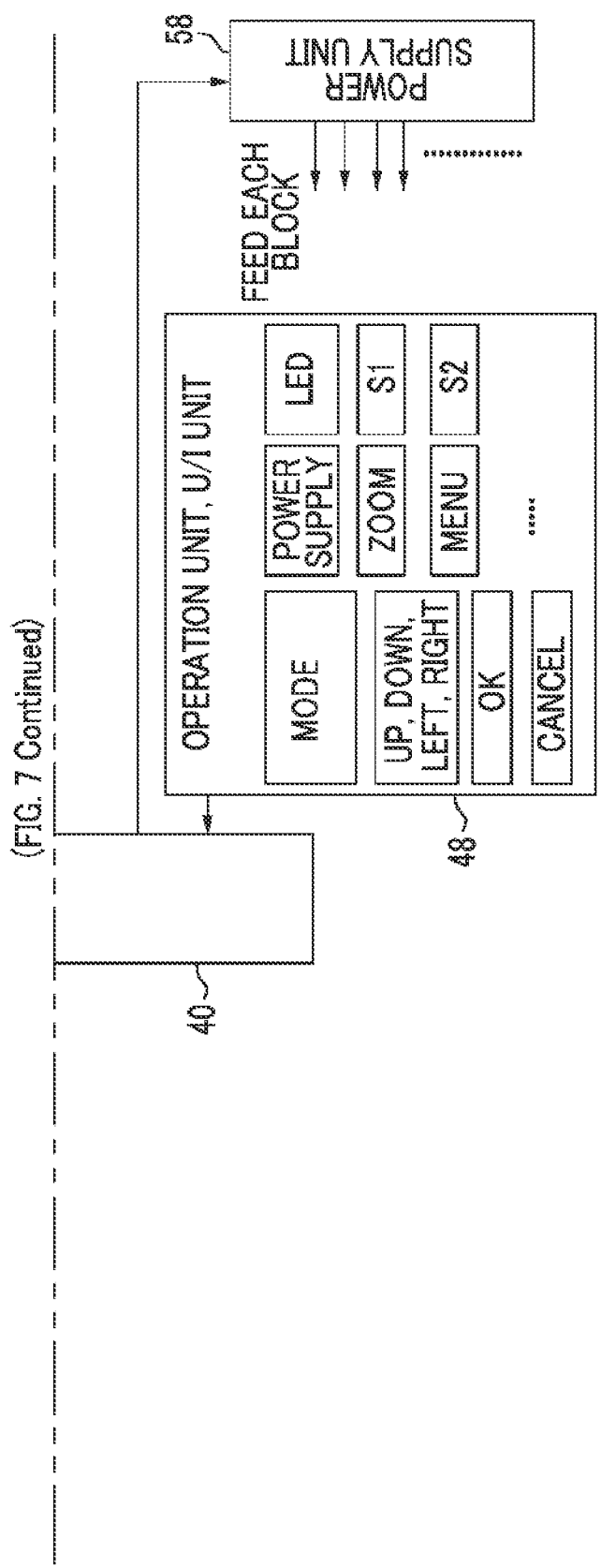

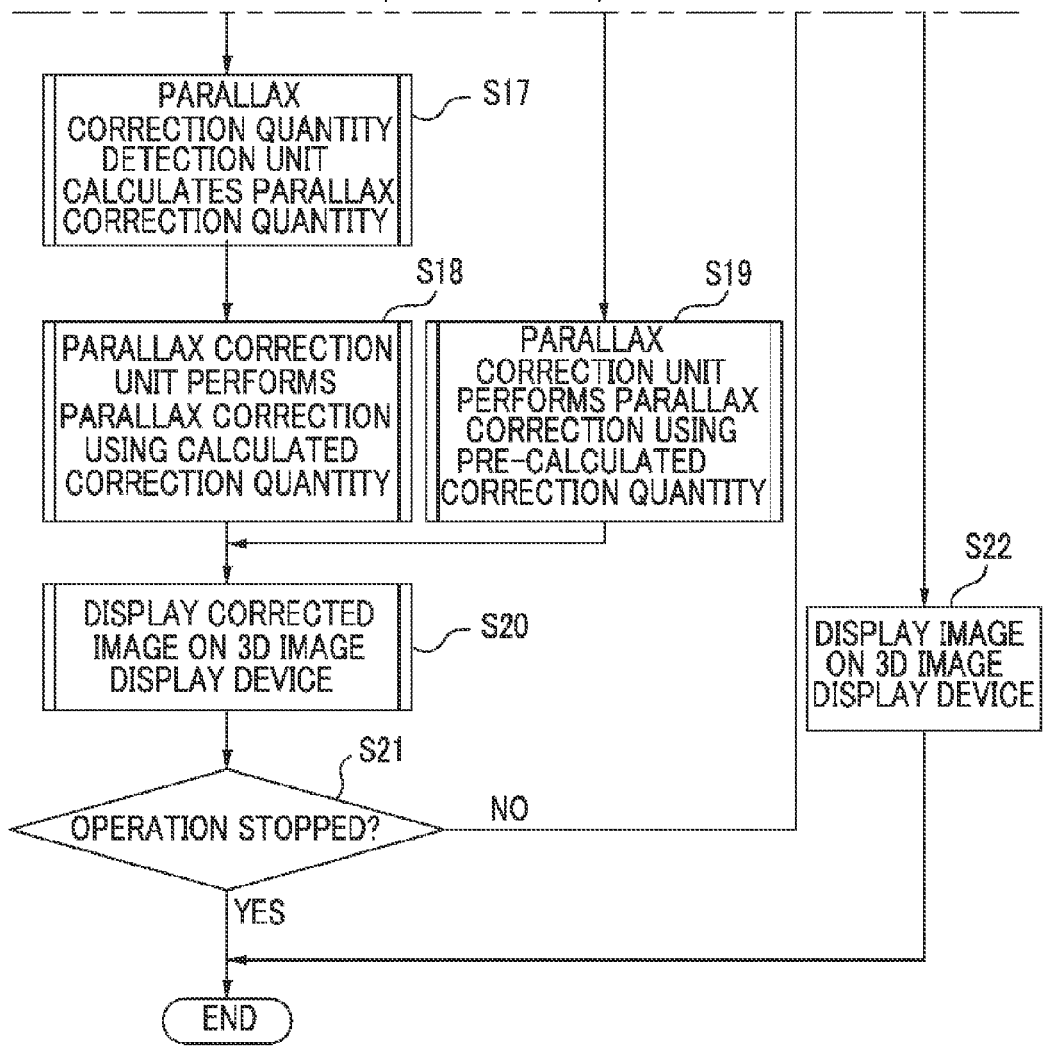

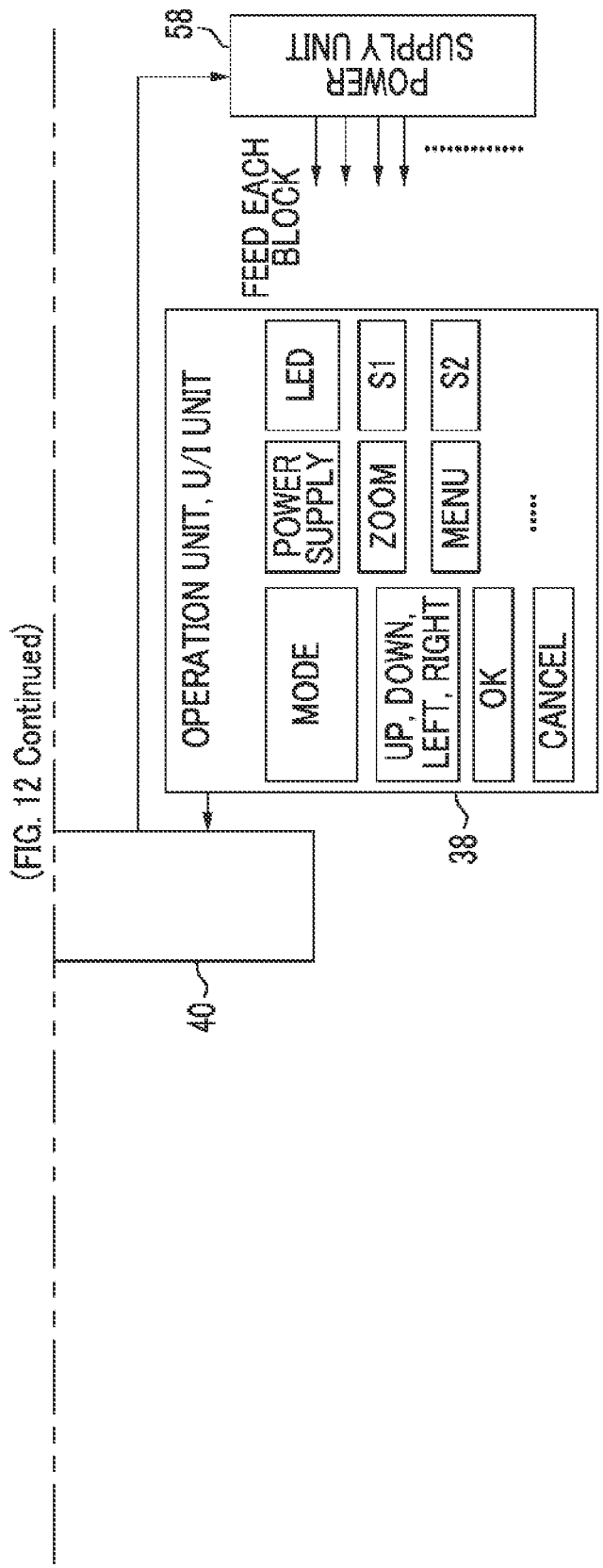

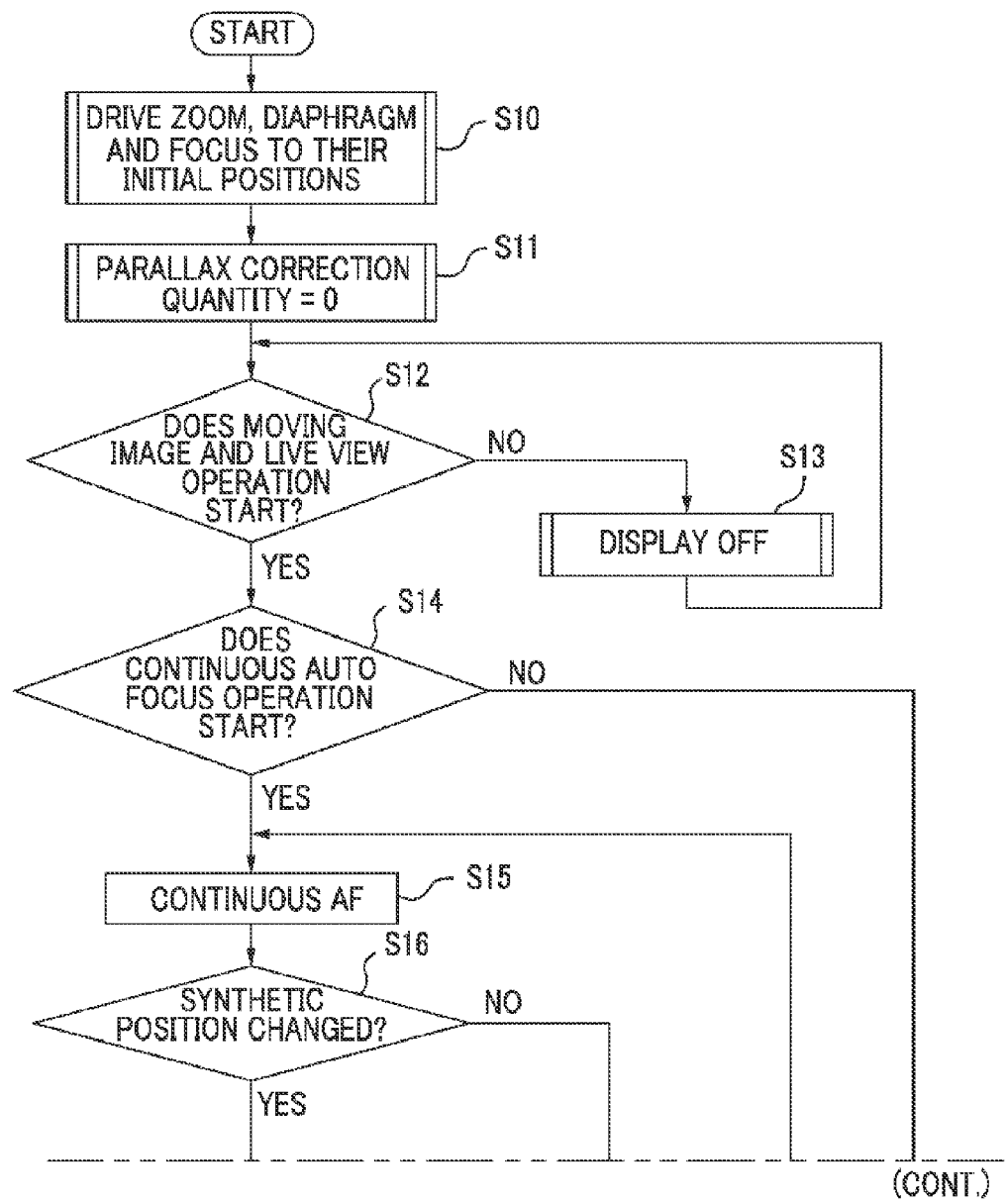

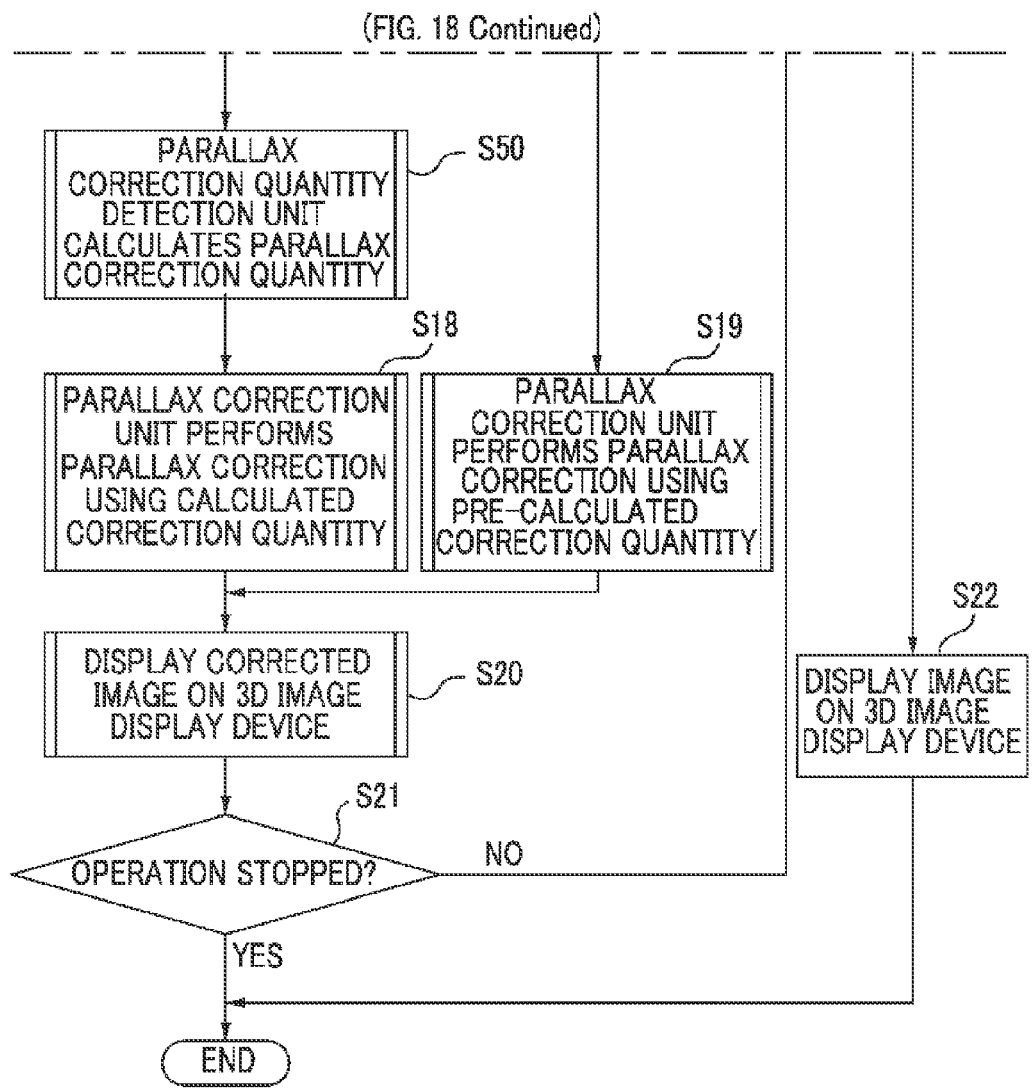

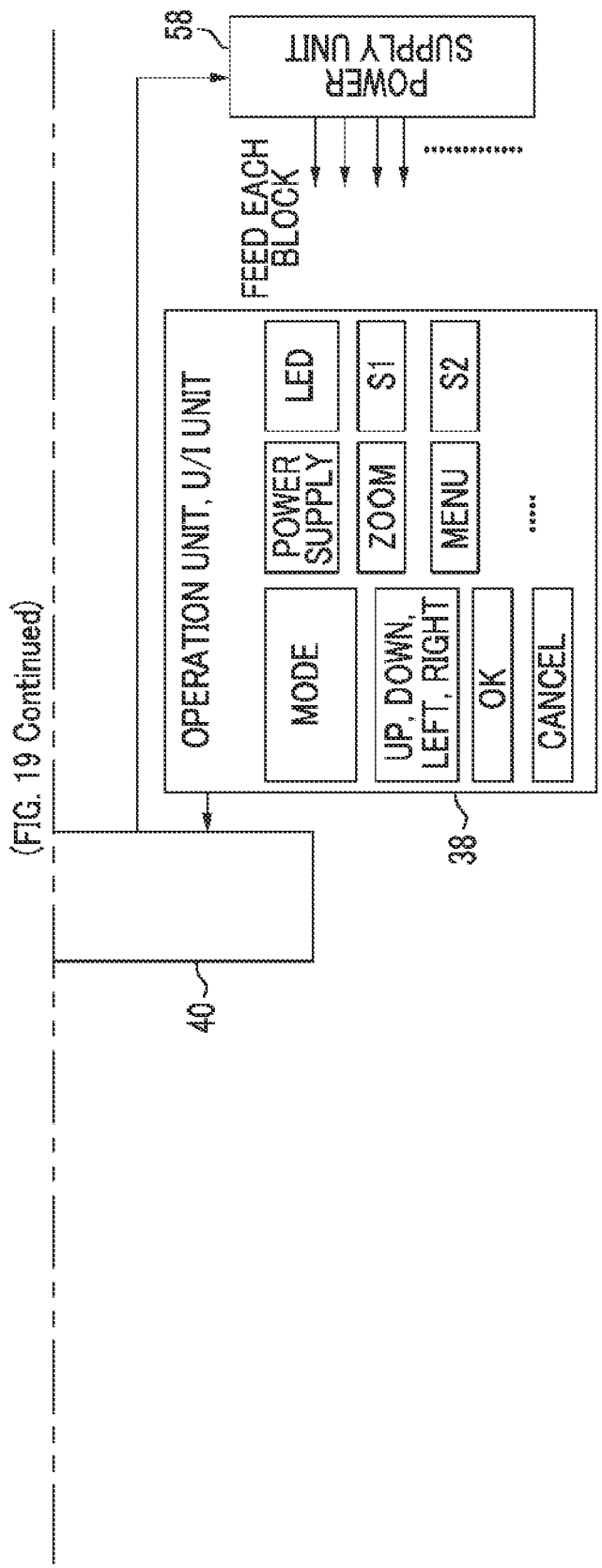

SINGLE-EYE STEREOSCOPIC IMAGE CAPTURING DEVICE

BACKGROUND OF THE INVENTION

1. Field of the Invention

The present invention relates to a single-eye stereoscopic image (three-dimensional image: 3D image) capturing device, and more particularly to a technique to acquire a left-eye image and a right-eye image by forming an object image, which has passed through different areas in left and right directions of a photography lens, on respective imaging elements.

2. Description of the Related Art

JP-1998-42314A (JP-H10-42314A) discloses a parallax image input device that can photograph a parallax image using a single photography lens and an imaging element.

In a two-eye three-dimensional (3D) camera (two-eye stereoscopic image capturing device) which photographs a parallax image by separating light flux that has passed through a photography lens into a plurality of light fluxes (pupil division) using the single photography lens (hereinafter referred to as a "pupil division method"), parallax becomes "0" in a focusing position, and the parallax depends on a defocusing quantity in a non-focusing position. Accordingly, if a focus lens is moved to change a focus point, the parallax (hereinafter referred to as a "parallax quantity") is changed depending on the defocusing quantity.

SUMMARY OF THE INVENTION

In general, at the time of photographing with a two-eye 3D camera, it becomes possible to confirm what kind of image has been photographed by stereoscopically displaying a photographed image for a left eye (hereinafter referred to as a left-eye image) and an image for a right eye (hereinafter referred to as a right-eye image).

In a pupil division type two-eye 3D camera, if an object on front side is focused on, the parallax quantity of the focused object (object on front side) becomes 0, and the position of the 3D reproduction image (position of a virtual image) coincides with a display surface. As the focusing position is moved toward the back, the position where the parallax quantity becomes 0 slips off the back, and the object on front side seems to jump out of the display surface.

FIGS. 20A to 20C are views illustrating the relationship between a focus point and the parallax quantity. The focusing position slips off the back in FIGS. 20A to 20C. FIG. 20A illustrates a case where a tree is focused on (that is, the tree is set as a focus point), FIG. 20B illustrates a case where a car is focused on (that is, the car is set as the focus point), and FIG. 20C illustrates a case where a house is focused on (that is, the house is set as the focus point).

In the case of FIG. 20A, the parallax quantity between a right-eye image and a left-eye image of the tree is 0, and the position of the car in the right-eye image is some way toward the back for the left-eye image, and the position of the house in the right-eye image is further towards the back and has more parallax quantity than the car for the left-eye image. In the case of FIG. 20B, the parallax quantity between a right-eye image and a left-eye of the car is 0, and the position of the tree in the right-eye image is on front side for the left-eye image, and the position of the house in the right-eye image is toward the back for the left-eye image. In the case of FIG. 20C, the parallax quantity between a right-eye image and a left-eye of the house is 0, and the position of the car in the right-eye image is some way toward front side for the left-eye image, and the position of the tree in the right-eye image is on front side with the parallax quantity that is larger than the car for the left-eye image.

Like an imaging element AF or a continuous focus operation of a moving image, the focusing position is frequently changed. That is, if the focus point is changed, the quantity of objects that jump out is frequently changed back and forth. For example, if it is assumed that a photographer pays attention to the car, the focus point is changed as shown in FIGS. 20A to 20C, and the parallax quantity of the car falls from front side to the back side. Because of this, the photographer may cause discomfort by the change of the parallax quantity. This is a phenomenon peculiar to the pupil division type two-eye 3D camera.

However, JP-1998-42314A (JP-H10-42314A) fails to mention adjustment of the parallax quantity.

JP-2002-90921A describes that a parallax quantity is adjusted by automatically controlling a convergence angle depending on an object distance, and JP-2003-1037601A describes that a parallax quantity is adjusted by changing a base length and a convergence angle depending on a zoom change. However, these are methods peculiar to a multi-eye (two or more) 3D camera that photographs a parallax image using at least two imaging systems, but are unable to be applied to a two-eye 3D camera.

JP-1996-317429A (JP-H8-317429) describes an invention to adjust a parallax quantity by changing a take-out position when performing expansion by an electronic zoom, but this cannot cope with the change of a parallax quantity depending on the movement of a focus lens.

The present invention has been made in view of such situations, and an object of the invention is to provide a single-eye stereoscopic image capturing device, which can reduce the discomfort of a photographer by constantly maintaining a parallax quantity of a left-eye image and a right-eye image that are 3D-displayed even if a focus lens is moved.

According to an aspect of the present invention, a single-eye stereoscopic image capturing device includes a photographic optical system including a focus lens; pupil division part for dividing light flux that has passed through the photographic optical system into a plurality of light fluxes; imaging part for acquiring a left-eye image and a right-eye image by receiving the plurality of light fluxes divided by the pupil division part; focus lens driving part for moving a focusing position of the focus lens; parallax correction quantity calculation part for calculating a parallax correction quantity for constantly maintaining a parallax quantity of a main object of the left-eye image and the right-eye image when the focusing position of the focus lens is moved by the focus lens driving part; parallax correction part for performing parallax correction of the left-eye image and the right-eye image by moving at least one of the left-eye image and the right-eye image in left and right directions by the calculated parallax correction quantity if the parallax correction quantity is calculated by the parallax correction quantity calculation part; display part for recognizably displaying the left-eye image and the right-eye image as a 3D image; and output part for outputting the left-eye image and the right-eye image, which have been acquired by the imaging part, or the left-eye image and the right-eye image, of which the parallax correction has been performed by the parallax correction part. Further, "the parallax quantity of the main object" described herein is, for example, the parallax quantity in the center position of the main object in an image or an average parallax quantity of the main object.

According to the single-eye stereoscopic image capturing device, in the case where the left-eye image and the right-eye image are photographed by pupil division, if the focusing position of the focus lens is moved, the parallax correction quantity for constantly maintaining the parallax quantity of the main object of the left-eye image and the right-eye image is calculated, and the parallax correction is performed by moving at least one of the left-eye image and the right-eye image in the left and right directions by the calculated parallax correction quantity. Through this, even if the focusing position of the focus lens is moved, the parallax quantity of the left-eye image and the right-eye image can be constantly maintained. Further, the main object mentioned in the present invention can be applied to various cases, such as an object that is in the center of a screen and a person detected by face detection.

The single-eye stereoscopic image capturing device according to the aspect of the present invention may further include display part for recognizably displaying the left-eye image and the right-eye image as a 3D image, wherein the output part outputs the left-eye image and the right-eye image, which have been acquired by the imaging part, or the left-eye image and the right-eye image, of which the parallax correction has been performed by the parallax correction part, to the display part.

According to the single-eye stereoscopic image capturing device, after the parallax correction is performed, the right-eye image and the left-eye image are displayed as the 3D image. Accordingly, even if the focus lens is moved, the parallax quantity of the left-eye image and the right-eye image that are 3D-displayed can be constantly maintained and thus the discomfort of the photographer can be reduced.

The single-eye stereoscopic image capturing device according to the aspect of the present invention may further include first recording part for recording the left-eye image and the right-eye image, wherein the output part outputs the left-eye image and the right-eye image, which have been acquired by the imaging part, or the left-eye image and the right-eye image, of which the parallax correction has been performed by the parallax correction part, to the first recording part.

According to the single-eye stereoscopic image capturing device, after the parallax correction is performed, the right-eye image and the left-eye image are recorded. Accordingly, the image, in which the parallax quantity of the left-eye image and the right-eye image is constantly maintained, can be 3D-displayed later or can be read with other 3D display devices.

In the single-eye stereoscopic image capturing device according to the aspect of the present invention, it is preferable that the parallax correction quantity calculation part calculates the parallax correction quantity whereby the parallax quantity of the main object always becomes 0.

According to the single-eye stereoscopic image capturing device, if the focus lens is moved, the parallax correction quantity whereby the parallax quantity of the main object of the left-eye image and the right-eye image becomes 0 is calculated. Through this, the photographer making a movement that is different from the normal eye movement is prevented, and thus the discomfort of the photographer can be certainly reduced.

In the single-eye stereoscopic image capturing device according to the aspect of the present invention, it is preferable that the parallax correction quantity calculation part detect corresponding points of the main object from the left-eye image and the right-eye image, and calculate the parallax correction quantity whereby a deviation quantity between the detected corresponding point of the left-eye image and the detected corresponding point of the right-eye image is constantly maintained.

According to the single-eye stereoscopic image capturing device, the corresponding points of the main object are detected from the left-eye image and the right-eye image, and the parallax correction quantity whereby the deviation quantity between the detected corresponding point of the left-eye image and the detected corresponding point of the right-eye image is constantly maintained is calculated. Through this, in the case where the focusing position is not obtained, for example, even before the AF processing is performed, the parallax correction quantity can be calculated.

The single-eye stereoscopic image capturing device according to the aspect of the present invention may further include movement quantity calculation part for calculating a movement quantity of the focusing position of the focus lens when the focusing position of the focus lens is moved by the focus lens driving part, wherein the parallax correction quantity calculation part calculates the parallax correction quantity based on the movement quantity of the focusing position of the focus lens that is calculated by the movement quantity calculation part.

According to the single-eye stereoscopic image capturing device, if the focusing position of the focus lens is moved, the movement quantity of the focusing position of the focus lens is calculated, and the parallax correction quantity is calculated based on the movement quantity of the focusing position of the focus lens. Through this, the parallax correction quantity that occurs when the focusing position of the focus lens is moved can be certainly calculated.

The single-eye stereoscopic image capturing device according to the aspect of the present invention may further include focusing position acquisition part for acquiring the focusing position based on the position of the focus lens; and second recording part for recording correlation between the focusing position and the parallax correction quantity, wherein the parallax correction quantity calculation part calculates the parallax correction quantity based on the focusing position acquired by the focusing position acquisition part and the correlation between the focusing position and the parallax correction quantity recorded in the second recording part.

According to the single-eye stereoscopic image capturing device, the correlation between the focusing position and the parallax correction quantity is recorded, and the parallax correction quantity is calculated based on the focusing position calculated in the focusing position of the focus lens and the correlation between the recorded focusing position and the parallax correction quantity. Through this, the parallax correction quantity that occurs when the focusing position is changed (focus point is changed) can be certainly calculated.

The single-eye stereoscopic image capturing device according to the aspect of the present invention may further include a diaphragm adjusting an amount of light that is incident to the imaging part through the photographic optical system; and diaphragm value detection part for detecting a diaphragm value of the diaphragm, wherein a plurality of records of the correlation between the focusing position and the parallax correction quantity are made in the second recording part according to the detected diaphragm value of the diaphragm, and the parallax correction quantity calculation part determines the correlation between the focusing position and the parallax correction quantity, which is used to calculate the parallax correction quantity, among the plurality of recorded correlations between the focusing position and the parallax correction quantity in the second recording part based on the diaphragm value of the diaphragm calculated by the diaphragm value detection part.

According to the single-eye stereoscopic image capturing device, a plurality of records of the correlation between the focusing position and the parallax correction quantity are made according to the diaphragm value of the diaphragm. The diaphragm value of the diaphragm is detected, and based on the detected diaphragm value, the correlation between the focusing position and the parallax correction quantity, which is used to calculate the parallax correction quantity, among the plurality of recorded correlations between the focusing position and the parallax correction quantity is determined. In the pupil division type single-eye stereoscopic image capturing device, as the object is bright, the depth of field of the object becomes shallow, and the parallax quantity occurs easily. However, through this, the correlation between the focusing position and the parallax correction quantity, which is used to calculate the parallax correction quantity, can be changed based on the diaphragm value. Accordingly, appropriate parallax correction quantity can be calculated depending on the brightness of the object.

In the single-eye stereoscopic image capturing device according to the aspect of the present invention, it is preferable that the photographic optical system include a zoom lens, and focal length detection part for detecting a focal length in a position of the zoom lens be further provided, wherein a plurality of records of the correlation between the focusing position and the parallax correction quantity are made in the second recording part according to the focal length, and the parallax correction quantity calculation part determines the correlation between the focusing position and the parallax correction quantity, which is used to calculate the parallax correction quantity, among the plurality of recorded correlations between the focusing position and the parallax correction quantity in the second recording part based on the focal length detected by the focal length detection part.

According to the single-eye stereoscopic image capturing device, a plurality of records of the correlation between the focusing position and the parallax correction quantity are made according to the focal length. The focal length is detected in the position of the zoom lens, and based on the detected focal length, the correlation between the focusing position and the parallax correction quantity, which is used to calculate the parallax correction quantity, is determined from among the plurality of recorded correlations between the focusing position and the parallax correction quantity. In the pupil division type single-eye stereoscopic image capturing device, as the zoom position goes to the distance side, the depth of field of the object becomes shallow, and the parallax quantity occurs easily. However, through this, the correlation between the focusing position and the parallax correction quantity, which is used to calculate the parallax correction quantity, can be changed based on the focal length. Accordingly, appropriate parallax correction quantity can be calculated depending on the focal length.

The single-eye stereoscopic image capturing device according to the aspect of the present invention may further include automatic focusing part for moving the focusing position of the focus lens through the focus lens driving part so that the main object is focused on based on the left-eye image and the right-eye image acquired by the imaging part, wherein the imaging part continuously acquires the left-eye image and the right-eye image, and the automatic focusing part continuously moves the focusing position of the focus lens while the imaging part continuously acquires the left-eye image and the right-eye image.

According to the single-eye stereoscopic image capturing device, while the left-eye image and the right-eye image are continuously acquired, the focusing position of the focus lens is continuously moved so that the main object is focused on. Through this, during photographing of a live-view image that is a moving image displayed on a liquid crystal monitor in real time and a moving image, the parallax quantity of the left-eye image and the right-eye image that are 3D-displayed can be constantly maintained, and thus the discomfort of the photographer can be reduced.

The single-eye stereoscopic image capturing device according to the aspect of the present invention may further include automatic focusing part for moving the focusing position of the focus lens through the focus lens driving part so that the main object is focused on based on the left-eye image and the right-eye image acquired by the imaging part; and photography instructions input part for inputting photography instructions, wherein the imaging part acquires the left-eye image and the right-eye image one sheet at a time when the photography instructions are input by the photography instructions input part, and the automatic focusing part moves the focusing position of the focus lens before the imaging part acquires the left-eye image and the right-eye image one sheet at a time.

According to the single-eye stereoscopic image capturing device, if the photography instructions are input by the photography instructions input part, the focus lens is moved so that the main object is focused on, and thereafter, the left-eye image and the right-eye image are acquired one sheet at a time. Through this, during the AF processing before photographing of the still image, the parallax quantity of the left-eye image and the right-eye image that are 3D-displayed can be constantly maintained, and thus the discomfort of the photographer can be reduced.

In the single-eye stereoscopic image capturing device according to the aspect of the present invention, it is preferable that the parallax correction part move the left-eye image to the right side and the right-eye image to the left side or perform parallax correction by moving the left-eye image to the right side and the right-eye image to the left side when the focusing position of the focus lens is moved by the focus lens driving part in a direction where the focusing position is near, and the parallax correction part move the left-eye image to the left side and the right-eye image to the right side or perform parallax correction by moving the left-eye image to the left side and the right-eye image to the right side when the focusing position of the focus lens is moved by the focus lens driving part in a direction where the focusing position is far.

According to the single-eye stereoscopic image capturing device, if the focusing position of the focus lens is moved in the direction where the focusing position is near, (1) the left-eye image is moved to the right side, and (2) the right-eye image is moved to the left side, or (3) the parallax correction is performed by moving the left-eye image to the right side and the right-eye image to the left side. Further, if the focus lens is moved in the direction where the focusing position is far, (1) the left-eye image is moved to the left side, and (2) the right-eye image is moved to the right side, or (3) the parallax correction is performed by moving the left-eye image to the left side and the right-eye image to the right side. Through this, the right-eye image and the left-eye image can be moved to negate the change of the parallax quantity.

According to the present invention, even if the focus lens is moved, the parallax quantity of the left-eye image and the right-eye image that are 3D-displayed can be constantly maintained, and thus the discomfort of the photographer can be reduced.

BRIEF DESCRIPTION OF THE DRAWINGS

FIGS. 5A to 5C are partially enlarged views of FIG. 4, in which FIG. 5A shows a case where there is not pupil division, and FIGS. 5B and 5C show a case where there is pupil division.

FIGS. 6A to 6C are views illustrating the separation state of an image that is formed on an imaging element depending on the difference between a previous pin, focusing (best focus), and a following pin.

FIG. 18 is a flowchart of a live-view image photography processing of the single-eye stereoscopic image capturing device 3.

DESCRIPTION OF THE PREFERRED EMBODIMENTS

Hereinafter, a single-eye stereoscopic image capturing device according to embodiments of the present invention will be described in detail with reference to the accompanying drawings.

First Embodiment

[Overall Configuration of Imaging Device]

Figure 1:
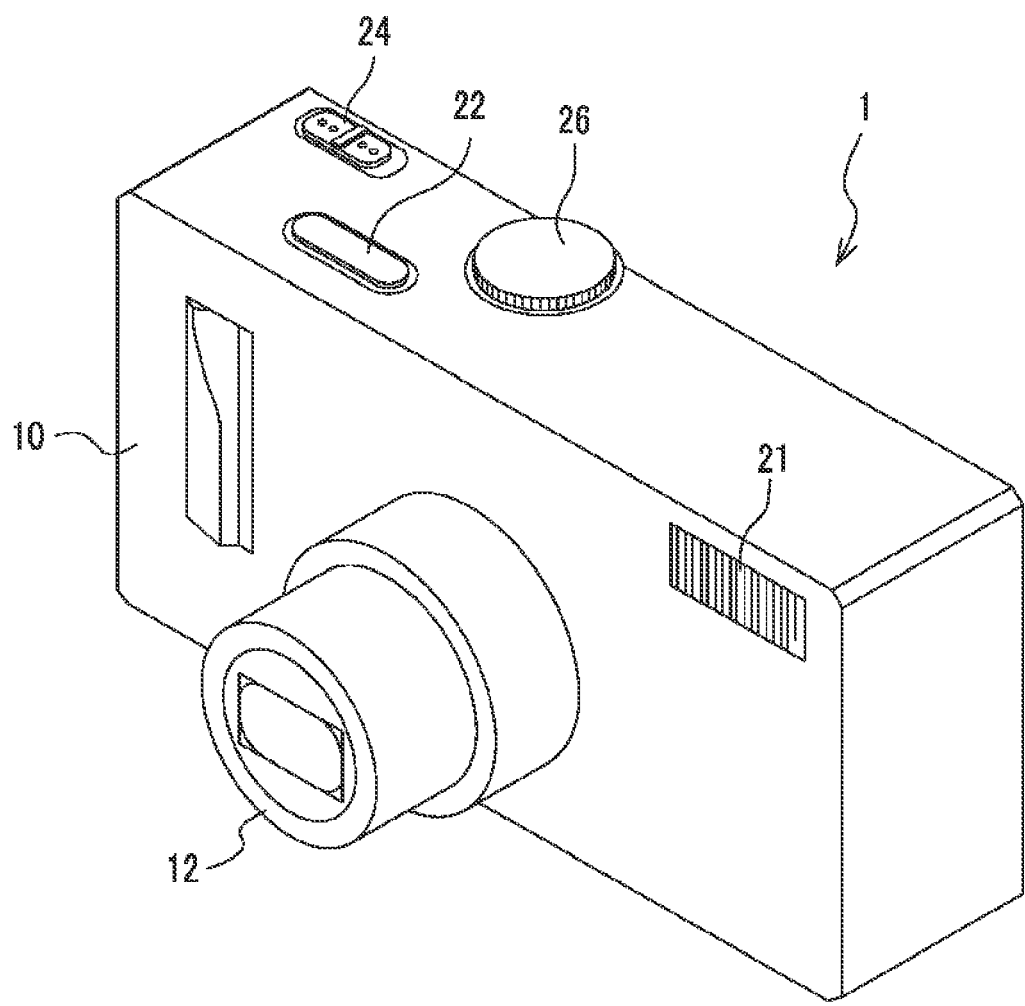
FIG. 1 is a front perspective view of a single-eye stereoscopic image capturing device 1 according to a first embodiment of the present invention.
Figure 2:
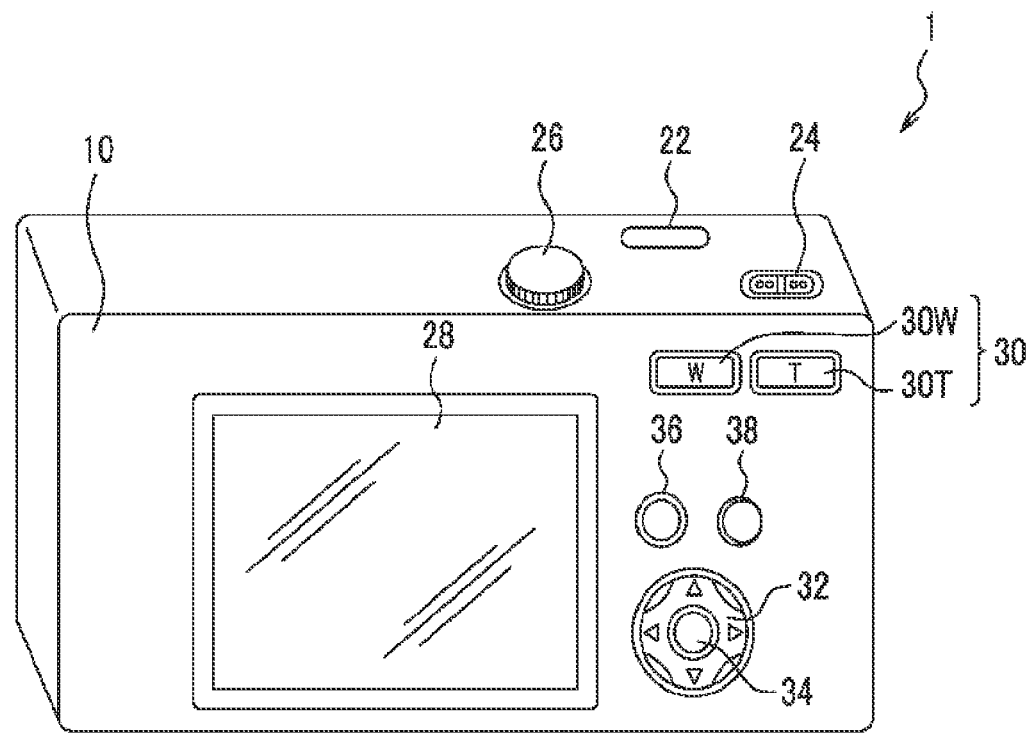
FIG. 2 is a rear view of the single-eye stereoscopic image capturing device 1.

FIG. 1 is a front perspective view of a single-eye stereoscopic image capturing device 1 that is an imaging device according to a first embodiment of the present invention, and FIG. 2 is a rear view of the single-eye stereoscopic image capturing device 1. The single-eye stereoscopic image capturing device 1 is a digital camera which receives light that has passed through a lens from an imaging element, converts the received light into a digital signal, and records the digital signal in a recording medium.

A camera body 10 of the single-eye stereoscopic image capturing device 1 is formed in an oblong rectangular box shape, and in the front, as sown in FIG. 1, a lens unit 12 and a stroboscope 21 are disposed. Further, on a front surface of the camera body 10, a shutter button 22, a power/mode switch 24, and a mode dial 26 are disposed. On the other hand, on a rear surface of the camera body 10, as shown in FIG. 2, a liquid crystal monitor 28, a zoom button 30, a cross button 32, a MENU/OK button 34, a reproduction button 36, and a BACK button 38 are disposed.

Further, on a bottom surface (not illustrated) of the camera body 10, a tripod screw hole, a battery insertion portion having a cover controlling opening and closing, and a memory card slot are provided. In the battery insertion portion and the memory card slot, a battery and a memory card are loaded, respectively.

The lens unit 12 includes a retractable zoom lens. Further, the lens unit 12 is drawn out from the camera body 10 if a camera mode is set to a photography mode by the power/mode switch 24. Since a zoom mechanism or a retractable mechanism of the lens unit 12 is a known technique, the explanation of the detailed configuration thereof will not be repeated.

The stroboscope 21 is to irradiate a main object with a flash of light.

The shutter button 22 includes a two-step stroke type switch consisting of so-called "half push" and "full push". When the single-eye stereoscopic image capturing device 1 is driven in the photography mode, AE/AF is operated by "half push" of the shutter button 22, and the photography is carried out by "full push" thereof. When the single-eye stereoscopic image capturing device 1 is driven in a projection mode, projection is executed by "full push" of the shutter button 22.

The power/mode switch 24 has both functions as a power switch to turn on/off the power of the single-eye stereoscopic image capturing device 1 and as a mode switch to set the mode of the single-eye stereoscopic image capturing device 1, and is slidably disposed between "OFF position", "reproduction position", and "photography position". The power of the single-eye stereoscopic image capturing device 1 is turned on when the power/mode switch 24 slides to be put at the "reproduction position" or "photography position", and is turned off when the power/mode switch 24 is put at the "OFF position". Further, the single-eye stereoscopic image capturing device 1 is set to the "reproduction mode" when the power/mode switch 24 slides to be put at the "reproduction position", and is set to the "photography mode" when the power/mode switch 24 is put at the "photography position".

The mode dial 26 functions as photography mode setting part for setting the "photography mode" of the single-eye stereoscopic image capturing device 1, and by the setting position of this dial, the photography mode of the single-eye stereoscopic image capturing device 1 is set to various modes. For example, the various modes may be a "plane image photography mode" to photograph a plane image, a "3D image photography mode" to photograph a 3D image, a "moving image photography mode" to perform moving image photography, a "3D panoramic photography mode" to perform 3D panoramic photography, and the like.

The liquid crystal monitor 28 is 3D display part that can display the left-eye image and the right-eye image as 3D images having predetermined directivities by parallax barriers. If a 3D image is input to the liquid crystal monitor 28, a parallax barrier having a pattern in which a light transmission portion and a light shield portion are alternately arranged with a predetermined pitch is generated on a parallax barrier display layer of the liquid crystal monitor 28, and paper-formed image pieces indicating left and right images are alternately arranged and displayed on an image display surface that is a lower layer of the parallax barrier display layer. In the case where the liquid crystal monitor 28 is used as a plane image of a user interface display panel, nothing is displayed on the parallax barrier display layer, and one sheet of an image is displayed on the lower image display surface as it is. Further, the form of the liquid crystal monitor 28 is not limited thereto, and it is sufficient if the liquid crystal monitor 28 can recognizably display a stereoscopic image as the 3D image. The liquid crystal monitor 28 may use a lenticular lens, or may provide individual viewing of the left-eye image and the right-eye image through wearing of dedicated glasses, such as polarization glasses and liquid crystal shutter glasses. Further, an organic EL monitor may be used instead of the liquid crystal monitor.

The zoom button 30 functions as zoom instruction part for instructing zooming, and includes a zoom tele button 30T instructing zooming to the distance side and a zoom wide button 30W instructing zooming to the wide angle side. In the photography mode of the single-eye stereoscopic image capturing device 1, the focal length of the lens unit 12 is changed in response to the operation of the zoom tele button 30T and the zoom wide button 30W. Further, in the reproduction mode, the reproduced image is expanded and reduced in response to the operation of the zoom tele button 30T and the zoom wide button 30W.

The cross button 32 is an operation portion to input instructions of four directions of up, down, left, and right, and functions as a button to select an item from a menu screen or to instruct a selection of various set items from respective menus (cursor movement operation part). The left/right key functions as a frame forwarding (forward/backward forwarding) button in the reproduction mode.

The MENU/OK button 34 is an operation key having both functions as a menu button for performing a command to display a menu on the screen of the liquid crystal monitor 28 and an OK button to command confirmation and execution of the selected contents.

The reproduction button 36 is a button to change to a reproduction mode to display a still image or a moving image of a photographed stereoscopic image (3D image) and a plane image (2D image) on the liquid crystal monitor 28.

The BACK button 38 functions as a button to instruct canceling of an input operation or returning to an operation state before one.

[Configuration Examples of Photographic Optical System and Imaging Element]

The lens unit 12 mainly include a photography lens 14, a diaphragm 16, and a solid state imaging device (hereinafter referred to as a "phase difference CCD") 17 that is a phase difference image sensor.

The photography lens 14 is an imaging optical system including a plurality of lenses, such as a focus lens and a zoom lens. The diaphragm 16 has, for example, five diaphragm blades, and is controlled, for example, in five steps by 1 AV, to have diaphragm values F2.8 to F11. In the photography mode, image light that indicates an object is formed on a light receiving surface of the phase difference CCD 17 through the photography lens 14 and the diaphragm 16.

Figure 3A:
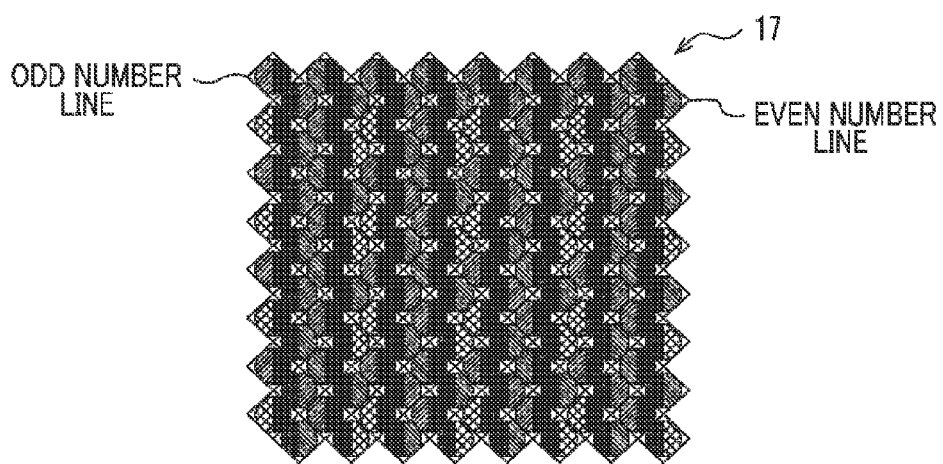
FIGS. 3A to 3C are views illustrating the configuration examples of a phase difference CCD of the single-eye stereoscopic image capturing device 1.
Figure 3B:
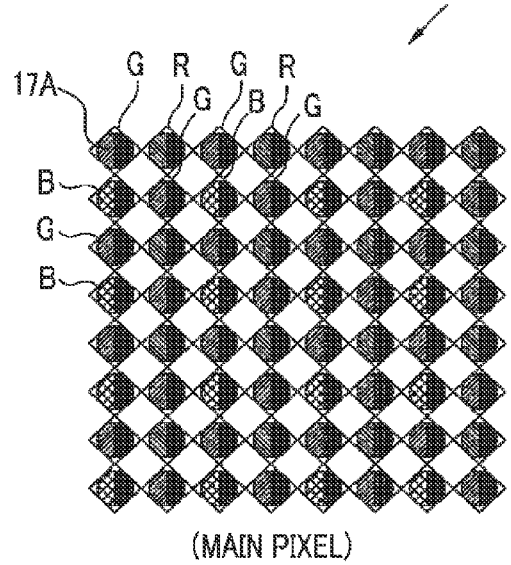
Figure 3C:
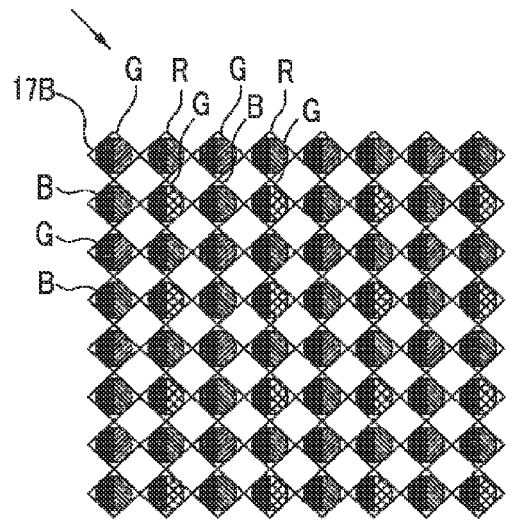

FIGS. 3A to 3C are views illustrating the configuration examples of the phase difference CCD 17.

The phase difference CCD 17 has pixels (main pixels) of odd lines and pixels (sub-pixels) of even lines, which are arranged in the form of a matrix, respectively, and image signals for two surfaces, into which the main and sub-pixels have been photoelectrically converted, can be read independently.

As shown in FIGS. 3A to 3C, in the odd lines 1, 3, 5, . . . of the phase difference CCD 17, pixel arrangement lines of GRGR . . . and pixel arrangement lines of BGBG . . . , are alternately provided, among the pixels having color filters of R (red), G (green), and B (blue), and in the pixels of the even lines 2, 4, 6, . . . , in the same manner as the odd lines, pixel arrangement lines of GRGR . . . and pixel arrangement lines of BGBG . . . are alternately provided, and as for the pixels of the even lines, the pixels are arranged to slip off in the line direction by ½ pitch.

Figure 4:
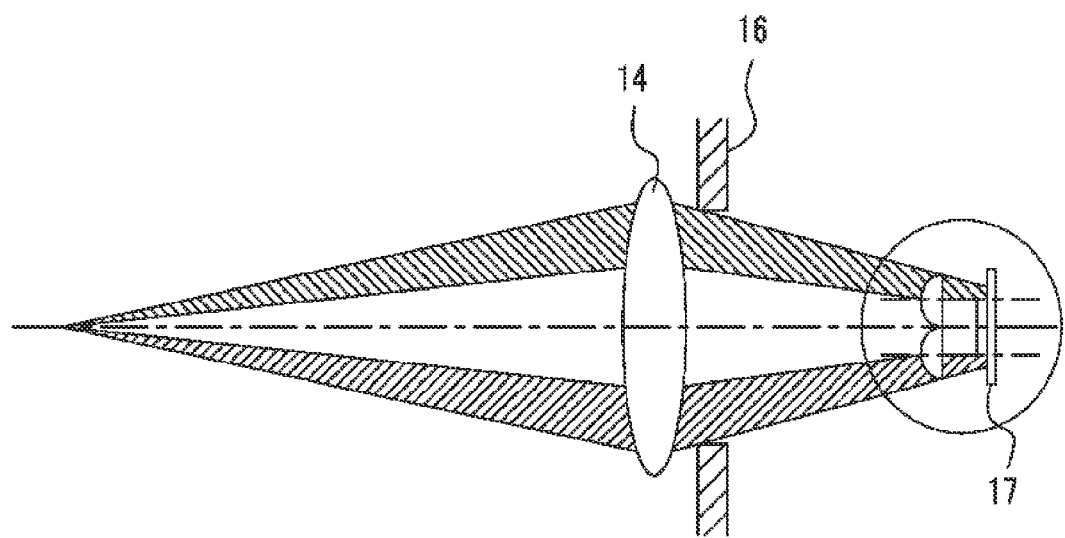
FIG. 4 is a view illustrating a photography lens, a diaphragm, and main and sub pixels of a phase difference CCD by one pixel.
Figure 5A:
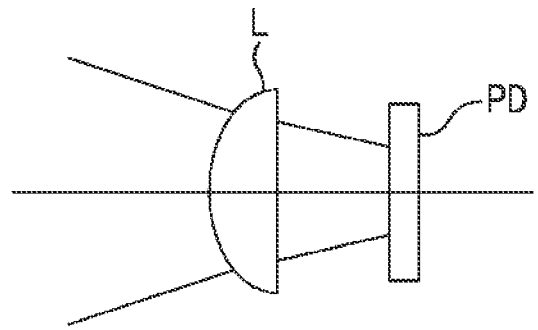
Figure 5B:
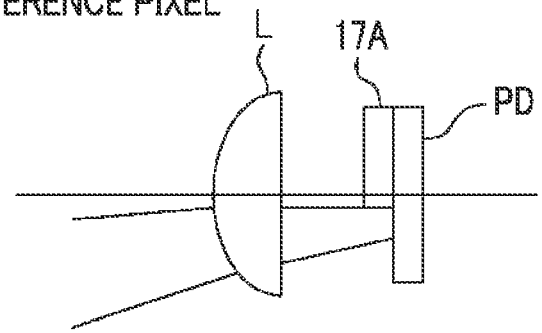
Figure 5C:
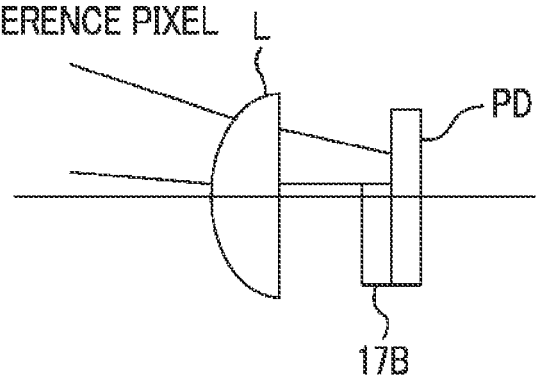

FIG. 4 is a view illustrating the photography lens 14 and the main and sub pixels of the phase difference CCD 17 by one pixel, and FIGS. 5A to 5C are partially enlarged views of the main part of FIG. 4.

On the front side (on the side of a micro lens L) of the main pixel of the phase difference CCD 17, a light shield member 17A is disposed, and on the front side of the sub-pixel, a light shield member 17B is disposed. The light shield members 17A and 17B have functions as pupil division members. As shown in FIG. 5A, light flux that passes through an exit pupil is incident to the pixel of a normal CCD (photodiode PD) through the micro lens L without being limited. As shown in FIG. 5B, the light shield member 17A shields the light in the right half of the light receiving surface of the main pixel (photodiode PD). Through this, only left side of the light axis of the light flux that passes through the exit pupil is received in the main pixel. Further, as shown in FIG. 5C, the light shield member 17B shields the light in the left half of the light receiving surface of the sub-pixel (photodiode PD). Through this, only right side of the light axis of the light flux that passes through the exit pupil is received in the sub-pixel.

As described above, the structure which photographs a 3D image with the phase difference CCD 17, through making the main pixel of the phase difference CCD 17 receive only the left side of the light axis of the light flux that passes through the exit pupil and making the sub-pixel receive only the right side of the light axis of the light flux that passes through the exit pupil, will be described.

Figure 7:
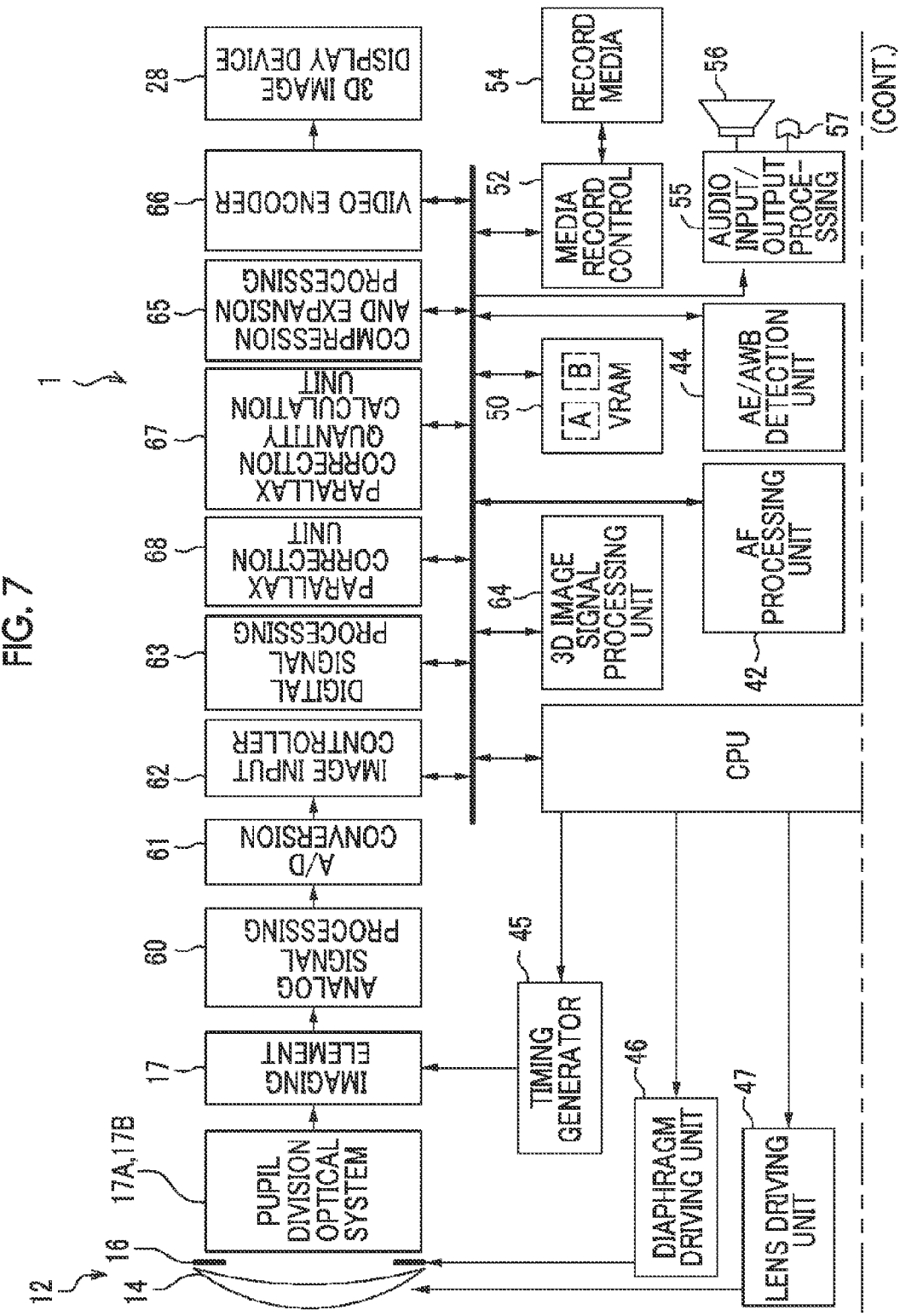
FIG. 7 is a block diagram of the internal configuration of the single-eye stereoscopic image capturing device 1.

FIGS. 6A to 6C are views illustrating the separation state of an image that is formed on an imaging element depending on the difference between a previous pin, focusing (best focus), and a following pin of a focus lens. In FIG. 7, the diaphragm 16 is omitted to compare the differences in separation by the focus.

As shown in FIG. 6B, the image which is focused on among the pupil-divided images is formed at (coincides with) the same position on the imaging element, and as shown in FIGS. 6A and 6C, the image which becomes the previous pin or the following pin is formed at (is separated from) a different position on the imaging element.

Accordingly, by acquiring the object images pupil-divided in the left and right directions through the phase difference CCD 17, the left-eye image and the right-eye image (3D image), of which the parallax quantity is different depending on the focus position, can be acquired.

The phase difference CCD 17 of the above-described configuration is configured so that the areas (right half and left half) where the light fluxes are limited by the light shield members 17A and 17B differ from each other in the main pixel and the sub-pixel. However, the configuration of the phase difference CCD 17 is not limited thereto, but the phase difference CCD 17 may be configured so that the light fluxes incident to the photodiode PD are limited by the direction in which the micro lens L and the photodiode PD relatively slip off in the left and right directions, or the light fluxes incident to the respective pixels are limited by preparing one micro lens with respect to two pixels (main pixel and sub-pixel).

[Internal Configuration of Imaging Device]

FIG. 7 is a block diagram of a single-eye stereoscopic image capturing device 1 according to a first embodiment of the present invention. This single-eye stereoscopic image capturing device 1 records a photographed image on a recording medium 54, and the operation of the overall device is generally controlled by a central processing unit (CPU) 40.

In the single-eye stereoscopic image capturing device 1, an operation unit 48 that includes a shutter button, a mode dial, a reproduction button, a MENU/OK key, a cross key, a BACK key, and the like is provided. A signal from the operation unit 48 is input to the CPU 40, and the CPU 40 controls the respective circuits of the single-eye stereoscopic image capturing device 1 based on the input signal, for example, performs a lens driving control, diaphragm driving control, photography operation control, image processing control, image data record/reproduction control, and display control of a liquid crystal monitor 28 for 3D display.

If the power of the single-eye stereoscopic image capturing device 1 is turned on by the power/mode switch 24, the power from a power supply unit 58 is supplied to respective blocks, and the single-eye stereoscopic image capturing device 1 starts to drive.

The light flux that has passed through the photography lens 14 and the diaphragm 16 is formed on the phase difference CCD 17, and signal charge is accumulated in the phase difference CCD 17. The signal charge accumulated in the phase difference CCD 17 is read as a voltage signal depending on the signal charge based on a read signal added from a timing generator 45. The voltage signal read from the phase difference CCD 17 is applied to an analog signal processing unit 60.

The analog signal processing unit 60 performs correlative double sampling processing (processing to obtain accurate pixel data by acquiring a difference between a feedthrough component level that is included in an output signal for one pixel of the imaging element and a pixel signal component level for the purpose of reducing noise (particularly, thermal noise) included in the output signal of the imaging element) with respect to the voltage signal output from the phase difference CCD 17. Accordingly, sample and hold of R, G, and B signals of each pixel is performed, and amplified R, G, and B signals are applied to an A/D converter 61. The A/D converter 61 converts the sequentially input R, G, and B signals into digital R, G, and B signals and outputs the digital R, G, and B signals to an image input controller 62.

The digital signal processing unit 63 performs predetermined signal processing, such as offset processing, gain and control processing including white balance correction and sensitivity correction, gamma correction processing, YC processing, and the like, with respect to the digital image signals input through the image input controller 62. Here, main image data that is read from main pixels of odd lines of the phase difference CCD 17 is processed as left-eye image data, and sub-image data that is read from sub-pixels of even lines is processed as right-eye image data.

The left-eye image data and the right-eye image data (3D image data) processed by the digital signal processing unit 63 are input to a VRAM 50. The VRAM 50 includes an area A and an area B in which the 3D image data that indicates the 3D image for one frame is recorded, respectively. In the VRAM 50, the 3D image data that indicates the 3D image for one frame is alternately written in the area A and the area B. Of the area A and the area B of the VRAM 50, the 3D image data is read from the area except for the area where the 3D image data is rewritten.

The 3D image data read from the VRAM 50 is processed to paper-formed image pieces by a 3D image signal processing unit 64, is encoded by a video encoder 66, and then is output to the liquid crystal monitor 28 for 3D display that is provided on the rear surface of a camera. Accordingly, 3D object images are continuously displayed on a display screen of the liquid crystal monitor 28.

If there is pressing (half press) of the first stage of a shutter button 22 of the operation unit 48, the CCD 40 starts an AF operation and AE operation and controls a lens driving unit 47 to move the focus lens in the optical axis direction so that the focus lens comes to the focusing position.

The AF processing unit 42 is a part to perform contrast AF processing or phase difference AF processing. In the case of performing the contrast AF processing, the AF processing unit 42 extracts a high-frequency component of the image data in a predetermined focus area of at least one of the left-eye image data and the right-eye image data, and calculates an AF evaluation value that indicates the focusing state by integrating the extracted high-frequency component. The AF control is performed by controlling the focus lens in the photography lens 14 so that the AF evaluation value becomes very large. Further, in the case of performing the phase difference AF processing, the AF processing unit 42 extracts a phase difference of the image data corresponding to the main pixels and the sub-pixels in the predetermined focus area of the left-eye image data and the right-eye image data, and obtains a defocusing quantity based on information that indicates the phase difference. The AF control is performed by controlling the focus lens in the photography lens 14 so that the defocusing quantity becomes 0.

The CPU 40, if necessary, changes the focal length by making the zoom lens make advance or retreat in the optical axis direction through the lens driving unit 47.

Further, at the time of half push of the shutter button 22, the image data output from the A/D converter 61 is taken into an AE/AWB detection unit 44.

The AE/AWB detection unit 44 integrates the G signal of the whole screen, or integrates the G signal of which the center part or the peripheral part is weighted, and outputs the integrated value to the CPU 40. The CPU 40 calculates the brightness (photography Ev value) of the object from the integrated value input from the AE/AWB detection unit 44, determines the diaphragm value of the diaphragm 16 and the electronic shutter (shutter speed) of the phase difference CCD 17 according to a predetermined program diagram based on the photography Ev value, and controls the diaphragm 16 through the diaphragm driving unit 46 based on the determined diaphragm value. In addition, the CPU 40 controls the charge storage time in the phase difference CCD 17 through the timing generator 45 based on the determined shutter speed.

If there is pressing (full press) of the second stage of the shutter button 22 after completion of the AE operation and the AF operation, image data for two sheets of the left-eye image (main image) and the right-eye image (sub-image) that correspond to the main pixel and the sub-pixel output from the A/D converter 61 in response to the pressing are input from the image input controller 62 to the VRAM 50, and are temporarily recorded.

The image data for two sheets temporarily recorded in the VRAM 50 is appropriately read by the digital signal processing unit 63, and the predetermined signal processing including generation processing (YC processing) of luminance data and chrominance data of the image data is performed. The YC-processed image data (YC data) is recorded again in the VRAM 50. Then, the YC data for two sheets is output to a compression extension processing unit 65, predetermined compression processing such as JPEG (Joint Photographic Experts Group) is executed, and then the compressed data is recorded again in the VRAM 50.

A multi-picture file (MP file: file of a form that a plurality of images are connected) is generated by the 3D image signal processing unit 64 from the YC data (compressed data) for two sheets recorded in the VRAM 50, is read by a media controller 52, and then is recorded in a recording medium 54.

Further, the AF operation is performed not only in the case where the pressing (half push) of the first stage of the shutter button 22 is made but also in the case where the right-eye image and the left-eye image are continuously photographed. The case where the right-eye image and the left-eye image are continuously photographed may be, for example, a case where a live-view image is photographed or a case where a moving image is photographed. In this case, the AF processing unit 42 performs continuous AF that continuously control the focus lens position by performing always repeated operation of AF evaluation values while the right-eye image and the left-eye image are continuously photographed. In this case, the parallax quantity of the right-eye image and the left-eye image displayed on the display screen of the liquid crystal monitor 28 is continuously changed depending on the movement of the focus lens position.

A parallax correction quantity calculation unit 67 calculates the change of the parallax quantity of the right-eye image and the left-eye image which are displayed on the display screen of the liquid crystal monitor 28 among the right-eye image, the left-eye image, and the phase difference AF which are continuously displayed on the display screen of the liquid crystal monitor 28. At this time, the reference is the case where the parallax quantity of a main object is 0. That is, the parallax correction quantity calculation unit 67 calculates the parallax correction quantity that is necessary to make the parallax quantity 0 by obtaining the parallax quantity of the main object of the right-eye image and the left-eye image which are displayed on the display screen of the liquid crystal monitor 28. Here, the main object may indicate an object that is in the center of the AF area, an object that is in the center of the screen, a face of a person or a pet that is detected by a face detection unit (not illustrated), or an object designated by an input from the operation unit 48. Further, since the method of detecting a face of a person or a pet through the face detection unit has already been known, the description thereof will not be repeated.

The parallax quantity of the main object of the right-eye image and the left-eye image which are displayed on the display screen of the liquid crystal monitor 28 is calculated based on an amount of slip of a corresponding point between the right-eye image data and the left-eye image data. For example, if it is assumed that images as shown in FIG. 20 are photographed and the main object is a car, the parallax correction quantity calculation unit 67 first detects a feature point of the main object (for example, position of the rear end of the car) from the left-eye image and the right-eye image, and detects a corresponding point that corresponds to the feature point from other images. Through this, the corresponding points are detected from the right-eye image data and the left-eye image data. Then, the parallax correction quantity calculation unit 67 calculates the amount of slip in the left and right directions of the corresponding points detected from the right-eye image data and the left-eye image data (here, feature point (here, the position of the rear end of the car) of the right-eye image data and the position of the rear end of the car of the left-eye image data), and calculates the quantity that the amount of slip becomes 0 as the parallax correction amount. The parallax correction quantity calculated by the parallax correction quantity calculation unit 67 is output to the parallax correction unit 68.

In this embodiment, the parallax correction quantity calculation unit 67 calculates the parallax correction quantity that is necessary to keep the parallax quantity of the main object 0. However, in order to achieve the purpose called reduction of the discomfort that is caused by the change of the parallax quantity due to the movement of the focus lens, it is sufficient to constantly maintain the parallax quantity of the main object, and the parallax quantity of the main object is not limited to 0.

However, if the parallax quantity of the main object is not 0, for example, if the parallax quantity of the main object is constantly maintained in a state where the main object has the parallax quantity in the direction where the main object jumps out of the display surface, a photographer naturally moves both eyes (spoke eye movement) toward the back at the same time (becomes cross-eyed). However, since the image is actually displayed on the display surface, it is necessary to match the focus of eyes on the display surface. That is, the photographer performs a hotchpotch among eyes to watch the think that jumps out toward the front and simultaneously focuses the display surface that does not jump out toward the front, which is different from the movement of normal eyes (hotchpotch among eyes at the same time to focus it near) when the photographer is going to read an article nearby. Accordingly, if the parallax quantity of the main object is not 0 although the parallax quantity of the main object is constantly maintained, the photographer feels fatigue.

Accordingly, in order to reduce the burden to depend on eyes of the photographer, it is preferable that a parallax correction quantity calculation unit 67 calculates the parallax correction quantity that is necessary to maintain the parallax quantity of the main object 0.

The parallax correction unit 68 moves at least one of the right-eye image data and the left-eye image data in the left and right directions by the parallax correction quantity calculated by the parallax correction quantity calculation unit 67. Through this, the distance between the main object of the right-eye image and the main object of the left-eye image is changed, and as a result, the distance between the main object of the right-eye image and the main object of the left-eye image is constantly maintained (in this embodiment, the distance is maintained 0) to perform the parallax correction.

The parallax correction quantity has direction information in addition to the size. The direction information may be a direction to bring the right-eye image and the left-eye image near or a direction to keep away the right-eye image and the left-eye image. Here, the relationship between the direction information of the parallax correction quantity and the moving direction of the focus lens, the direction information of the parallax correction quantity, and a parallax correction method will be described.

If the focus lens is moved such as the focusing position is far (slip-off toward the back), the position where the parallax quantity becomes 0 is far (slip-off toward the back). Accordingly, the object is moved in the direction to jump out toward the front, that is, the object of the right-eye image data is moved to the left side, and the main object of the left-eye image data is moved to the right side. Accordingly, the parallax correction quantity is calculated in the direction to move the right-eye image data to the right side and to move the left-eye image data to the left side, that is, in the direction to keep away the right-eye image data and the left-eye image data.

If the focus lens is moved, such as the focusing position is near (slip-off toward the front), the position where the parallax quantity becomes 0 is near (slip-off toward the front). Accordingly, the object is moved in the direction to go down toward the back, that is, the object of the right-eye image data is moved to the left side, and the main object of the left-eye image data is moved to the right side. Accordingly, the parallax correction quantity is calculated in the direction to move the right-eye image data to the left side and to move the left-eye image data to the right side, that is, in the direction to bring the right-eye image data and the left-eye image data near.

If it is calculated that the right-eye image data and the left-eye image data move as long as A in the direction to keep away the data, the parallax correction unit 68 (1) moves the left-eye image data as long as A to the left side, (2) moves the right-eye image as long as A to the right side, and (3) performs the parallax correction of the right-eye image data and the left-eye image data so that the parallax quantity become 0 using any one of a method of moving the right-eye image data to the right side as long as A/2 and a method of moving the left-eye image data to the left side as long as A/2. Further, if it is calculated that the right-eye image data and the left-eye image data move as long as B in the direction to bring the data near, the parallax correction unit 68 (1) moves the left-eye image data as long as B to the right side, (2) moves the right-eye image as long as B to the left side, and (3) performs the parallax correction of the right-eye image data and the left-eye image data so that the parallax quantity become 0 using any one of a method of moving the right-eye image data to the right side as long as B/2 and a method of moving the left-eye image data to the left side as long as B/2.

The single-eye stereoscopic image capturing device 1 can record and reproduce a moving image, a still image, and voice. A microphone 57 inputs a transmitting voice, a speaker 56 outputs a receiving voice, and an audio input/output circuit 55 performs encoding of the voice input from the microphone and decoding of the received voice.

[Explanation of Operation of Imaging Device]

Next, the operation of the single-eye stereoscopic image capturing device 1 will be described. The imaging processing is controlled by the CPU 40. A program to cause the CPU 40 to execute the imaging processing is recorded in a program storage unit in the CPU 40.

Figure 8:
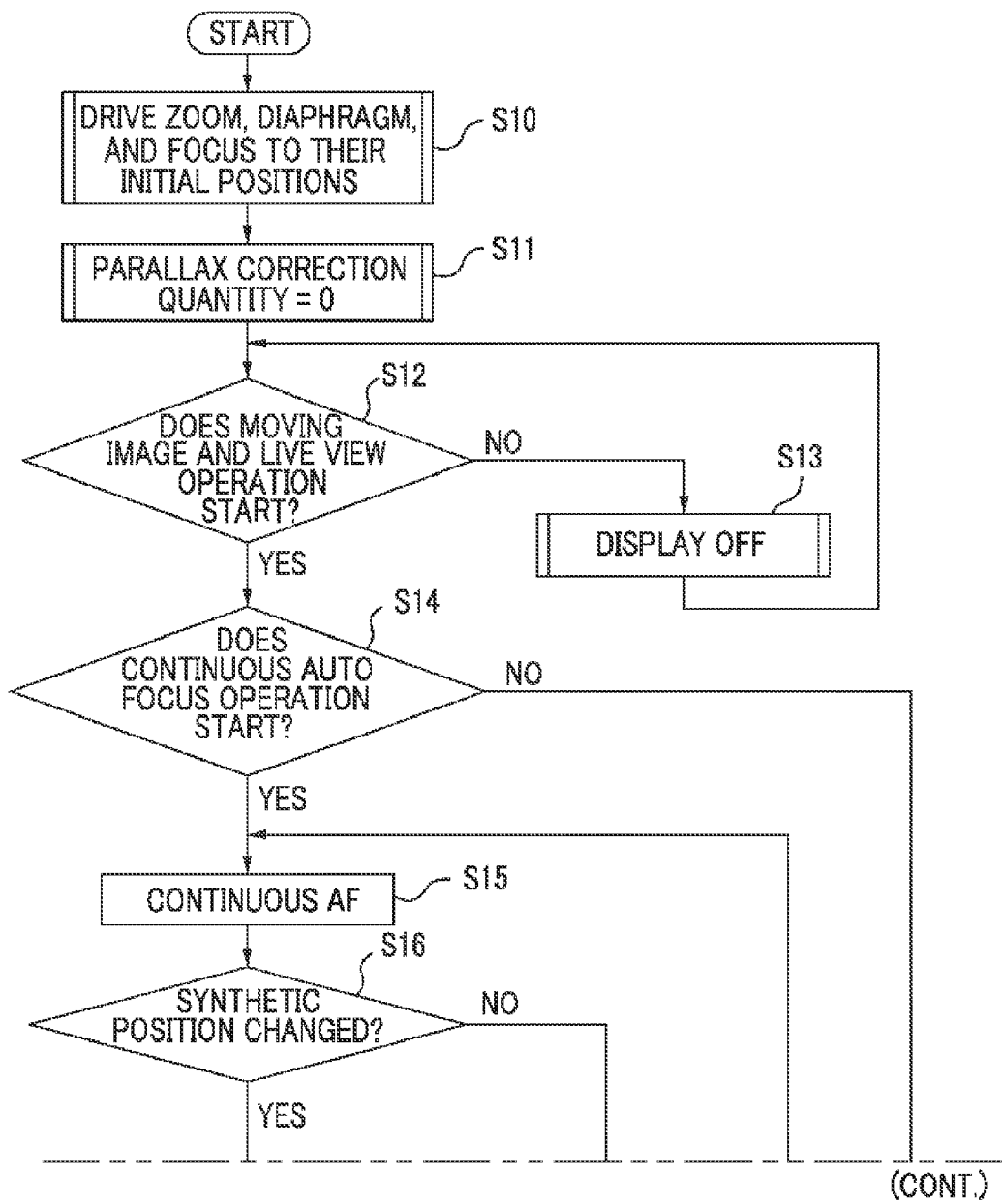
FIG. 8 is a flowchart of a live-view image photography processing of the single-eye stereoscopic image capturing device 1.

FIG. 8 is a flowchart illustrating a flow of photographing and displaying processes of a live-view image.

If the photographing starts, the CPU 40 drives the photography lens 14 and the diaphragm 16 to an initial position (step S10), and sets the parallax correction quantity at that time to 0 as an initial setting (step S11).

The CPU 40 determines whether or not instructions to start photographing of the live-view image have been input from the operation unit 48 (step S12). If the instructions to start photographing of the live-view image have not been input ("NO" in step S12), the CPU 40 turns off the liquid crystal monitor 28 (step S13).

If the instructions to start photographing of the live-view image have been input ("YES" in step S12), the object light that has passed through the photography lens 14 is formed on the light receiving surface of the phase difference CCD 17 through the diaphragm 16. Through the timing generator 45, the signal charge accumulated in the main pixels and the sub-pixels of the phase difference CCD 17 is sequentially read at a predetermined frame rate as the voltage signal (image signal) depending on the signal charge, and is sequentially input to the digital signal processing unit 63 through the analog signal processing unit 60, the A/D converter 61, and the image input controller 62. Accordingly, the left-eye image data and the right-eye image data are sequentially generated, and are sequentially input to the VRAM 50.

The CPU 40 changes an amount of opening (F value) of the diaphragm 16 through the diaphragm driving unit 46 based on the left-eye image data and the right-eye image data. Further, the CPU 40 performs zooming through the lens driving unit 47 depending on the input from the operation unit 48.

The CPU 40 determines whether or not to perform the continuous AF (step S14). Whether or not to perform the continuous AF is set through the operation unit 48, and is recorded in a recording part in the CPU 40. The CPU 40 performs determination based on the set information.

If it is determined that the continuous AF is not performed ("NO" in step S14), this is the case where the focus lens does not move, and thus the parallax quantity of the left-eye image data and the right-eye image data is always constant. Accordingly, the CPU 40 sequentially outputs the left-eye image data and the right-eye image data from the VRAM 50 and inputs the data to the 3D image signal processing unit 64. The image signal processing unit 64 generates and outputs luminance/chrominance signals to the liquid crystal monitor 28 through the video encoder 66. On the liquid crystal monitor 28, a parallax barrier is generated, and paper-formed image pieces with the left-eye image data and the right-eye image data are alternately arranged and displayed on an image display surface that is a lower layer of the parallax barrier (step S22). By sequentially performing this processing, the image that is imaged on the main pixels and the sub-pixels of the phase difference CCD 17 is displayed in real time.

If it is determined that the continuous AF is performed ("YES" in step S14), the AF processing unit 42 performs the continuous AF based on the left-eye image data and the right-eye image data (step S15).

The parallax correction quantity calculation unit 67 determines where or not the focusing position is changed by the continuous AF (step S16).

If the focusing position is changed ("YES" in step S16), it means that the focus lens has moved and the object that is focused, that is, the focus point, has been changed. In this case, the parallax correction quantity calculation unit 67 calculates the parallax correction quantity from the left-eye image data and the right-eye image data (step S17).

The parallax correction unit 68 makes the VRAM 50 output the left-eye image data and the right-eye image data, and moves at least one of the left-eye image data and the right-eye image data in the left and right directions based on the parallax correction quantity that is calculated by the parallax correction quantity calculation unit 67 to output the image data to the 3D image signal processing unit 64 (step S18).

If the focusing position is not changed ("NO" in step S16), it means that the focus lens has not moved and the object that is focused (the focus point) has not been changed. In this case, the parallax correction unit 68 makes the VRAM 50 output the left-eye image data and the right-eye image data, and moves at least one of the left-eye image data and the right-eye image data in the left and right directions based on the parallax correction quantity of the just previous frame (the parallax correction quantity that the parallax correction quantity calculation unit 67 calculated just previously, or if the parallax correction quantity calculation unit 67 has not calculated the parallax correction quantity, the parallax correction quantity initially set in step S11) to output the image data to the 3D image signal processing unit 64 (step S19). Accordingly, if the parallax correction quantity is 0, the left-eye image data and the right-eye image data are not moved.

The image signal processing unit 64 generates luminance/chrominance signals with respect to the left-eye image data and the right-eye image data that have been moved in the left and right directions by the parallax correction unit 68, and outputs the luminance/chrominance signals to the liquid crystal monitor 28 through the video encoder 66. On the liquid crystal monitor 28, the parallax barrier is generated, and the paper-formed image pieces with the left-eye image data and the right-eye image data are alternately arranged and displayed on the image display surface that is the lower layer of the parallax barrier (step S20).

The CPU 40 determines whether or not end instructions of the photography operation of the live-view image have been input from the operation unit 48 (step S21). If the end instructions of the photography operation of the live-view image have not been input ("NO" in step S21), the CPU 40 repeatedly performs the processing in steps S15 to S21. If the end instructions of the photography operation of the live-view image have been input ("YES" in step S21), this processing is terminated.

Through this, the parallax quantity of the image that is imaged on the main pixels and the sub-pixels of the phase difference CCD 17 is corrected so that the parallax quantity of the main object becomes constant, and the image is displayed in real time.

Figure 9A:
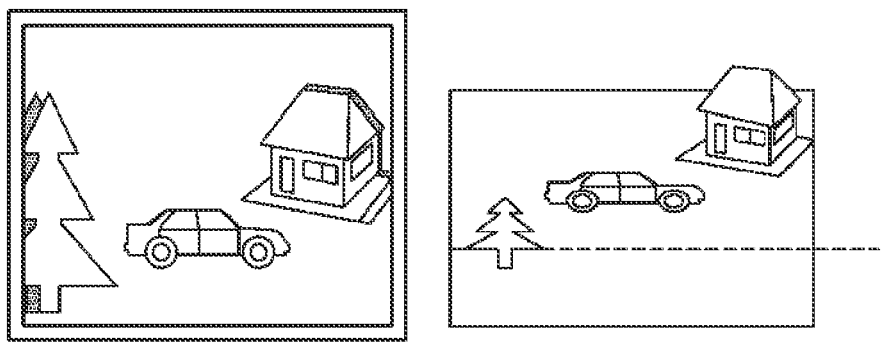
FIGS. 9A to 9C illustrate display examples in the case where the parallax quantity is constantly maintained, in which the focusing position is moved to the back side in FIGS. 9A to 9C.
Figure 9B:
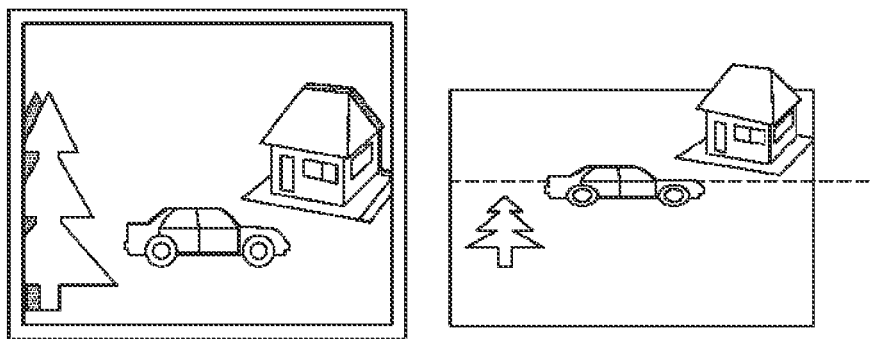
Figure 9C:
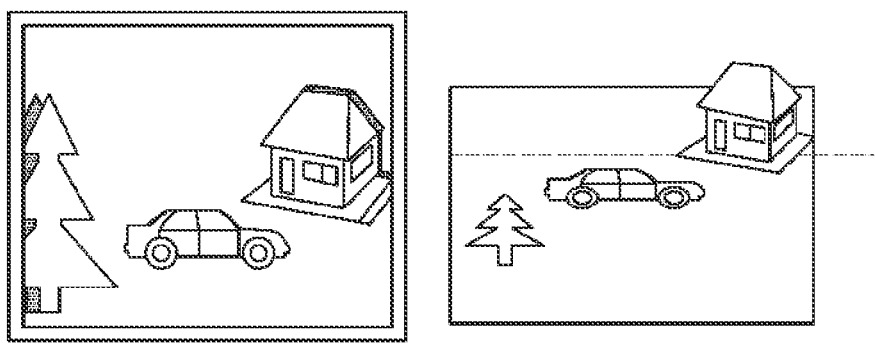

FIGS. 9A to 9C illustrate examples of display images in the case where the correction of the parallax quantity is performed. FIG. 9A illustrates a case where a tree has a focus point, FIG. 9B illustrates a case where a car has a focus point, and FIG. 9C illustrates a case where a house has a focus point. In this embodiment, since the parallax quantity is corrected so that the parallax quantity of the main object, that is, the car, becomes 0, an image in which the parallax quantity of the car becomes 0 is displayed on the liquid crystal monitor 28 regardless of the real focus point (in all of FIGS. 9A to 9C). Accordingly, the parallax quantity is not abruptly changed, and thus the photographer can comfortably view the 3D image.

The photographer can confirm the photography angle of view through viewing of the moving image (live-view image) that is displayed in real time on the liquid crystal monitor 28.

If the shutter button is half pressed, a signal S1ON is input to the CPU 40, and the CPU 40 performs the AE/AF operation through the AF processing unit 42 and the AE/AWB detection unit 44. In the photography processing of the 3D image, the AF processing unit 42 performs the AF operation by the phase difference AF processing.

If the shutter button is fully pressed, a signal S2ON is input to the CPU 40, and the CPU 40 starts the photography and recording process. That is, the CPU 40 exposes the phase difference CCD 17 with the determined shutter speed and diaphragm value based on the photometry result.

The image data for two sheets output from the main pixels and the sub-pixels of the phase difference CCD 17 is introduced into the VRAM 50 through the analog signal processing unit 60, the A/D converter 61, and the image input controller 62, is converted into luminance/chrominance signals through the 3D image signal processing unit 64, and then is stored in the VRAM 50. The left-eye image data stored in the VRAM 50 is applied to the compression extension processing unit 65 to be compressed according to a predetermined compression format (for example, JPEG form), and then is stored in the VRAM 50.

An MP file is generated from the compression data for two sheets recorded in the VRAM 50, and the MP file is recorded in the recording medium 54 through the media controller 52. Through this, the 3D image is photographed and recorded.

In this embodiment, it is exemplified that the 3D image is photographed. However, the single-eye stereoscopic image capturing device 1 can photograph both the plane image and the 3D image. In the case of photographing the plane image, the photography is performed using only the main pixels of the phase difference CCD 17. Since the details of the photography processing is the same as those in the case of photographing the 3D image, the description thereof will not be repeated.

The image recorded in the recording medium 54 as described above can be reproduced and displayed on the liquid crystal monitor 28 by setting the mode of the single-eye stereoscopic image capturing device 1 to a reproduction mode by means of a reproduction button.

If the reproduction mode is set, the CPU 40 outputs a command to the media controller 52, and reads the image file finally recorded in the recording medium 54.

The compressed image data of the read image file is applied to the compression extension processing unit 65 to be extended to a non-compressed luminance/chrominance signals, and then is output to the liquid crystal monitor 28 through the video encoder 66.

The top forwarding of the image is performed by left and right key operation of the cross key. If the right key of the cross key is pressed, the next image file is read from the recording medium 54 and is reproduced and displayed on the liquid crystal monitor 28. Further, if the left key of the cross key is pressed, the image file before one is read from the recording medium 54 and is reproduced and displayed on the liquid crystal monitor 28.

According to this embodiment, even during the display of the live-view image, the parallax quantity of the left-eye image and the right-eye image can be constantly maintained regardless of the movement of the focus lens, and thus the discomfort of the photographer can be reduced.

In this embodiment, the photography and display of the live-view image has been described as an example. However, the present invention can be applied to a case where the right-eye image data and the left-eye image data are continuously acquired and the continuous AF is performed, for example, in the case of photographing the moving image. The live-view image photography and the moving image photography differ from each other on the point that in the case of photographing the live-view image, the continuously photographed right-eye image data and left-eye image data are not recorded, whereas in the case of photographing the moving image, the continuously photographed right-eye image data and left-eye image data are recorded in the recording medium 54 in addition to the processing illustrated in FIG. 8. Since the process of recording the continuously photographed right-eye image data and left-eye image data in the recording medium 54 or the like is already known, the explanation thereof will not be repeated. The moving image is recorded in the recording medium 54 or the like, and in the case of not only photographing the moving image but also 3D-displaying the moving image after photographing, the parallax quantity of the right-eye image and the left-eye image can be constantly maintained, and the discomfort of the viewer can be reduced.

Second Embodiment

In the first embodiment of the present invention, the parallax quantity is constantly maintained during the photographing of the live-view image. However, the case where the parallax quantity is changed is not limited during the live-view image photography. In the case where the focus lens is moved, the parallax quantity may always be changed.

The second embodiment of the present invention corresponds to the adjustment of the parallax quantity during the AF processing in the photography preparation stage of the still image photography. Hereinafter, a single-eye stereoscopic image capturing device 2 according to the second embodiment of the present invention will be described. Since the whole configuration of the imaging device is the same as that according to the first embodiment, the explanation thereof will not be repeated, but only the operation of the imaging device will be described. In explanation of the operation of the imaging device, the same reference numerals are used for the same parts as the first embodiment, and the explanation thereof will not be repeated.

[Explanation of Operation of Imaging Device]

Next, the operation of the single-eye stereoscopic image capturing device 2 will be described. The imaging processing is controlled by the CPU 40. A program to cause the CPU 40 to execute the imaging processing is recorded in a program storage unit in the CPU 40.

The object light that has passed through the photography lens 14 is formed on the light receiving surface of the phase difference CCD 17 through the diaphragm 16. Through the timing generator 45, the signal charge accumulated in the phase difference CCD 17 is sequentially read at a predetermined frame rate as the voltage signal (image signal) depending on the signal charge, and is sequentially input to the digital signal processing unit 63 through the analog signal processing unit 60, the A/D converter 61, and the image input controller 62. Accordingly, the left-eye image data and the right-eye image data are sequentially generated, and are sequentially input to the VRAM 50. In this case, so-called pan-focus is performed in a state where the focus lens is moved to the standard focusing position (in this embodiment, initial position).

The left-eye image data and the right-eye image data are sequentially output from the VRAM 50, and the 3D image signal processing unit 64 generates and outputs luminance/chrominance signals to the liquid crystal monitor 28 through the video encoder 66. On the liquid crystal monitor 28, the parallax barrier is generated, and the paper-formed image pieces with the left-eye image data and the right-eye image data are alternately arranged and displayed on the image display surface that is the lower layer of the parallax barrier.

By sequentially performing this processing, the image that is imaged on the main pixels and the sub-pixels of the phase difference CCD 17 is displayed in real time. The photographer can confirm the photography angle of view through viewing of the image that is displayed on the liquid crystal monitor 28 in real time.

Figure 10:
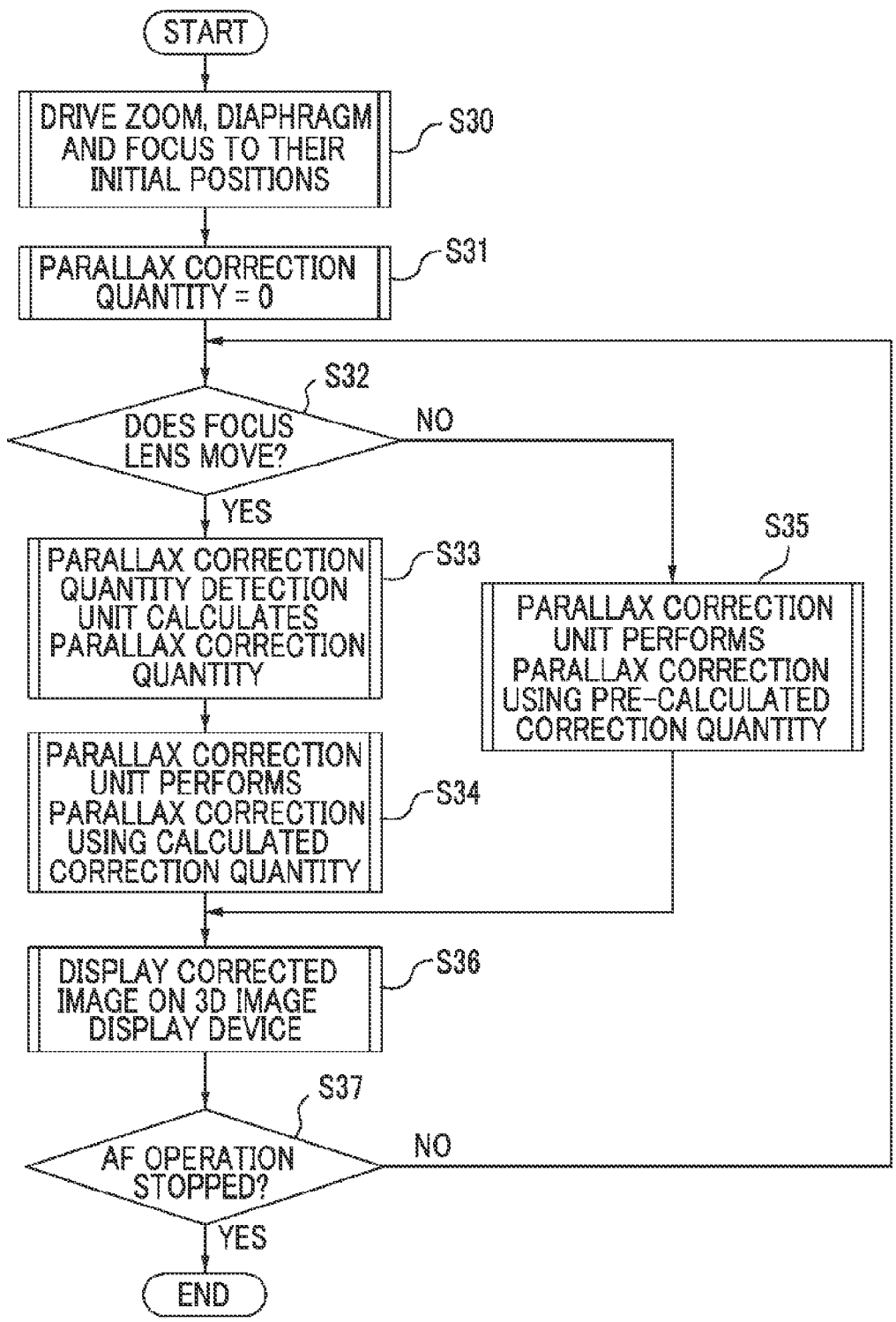
FIG. 10 is a flowchart of photography preparation processing of a single-eye stereoscopic image capturing device 2.

FIG. 10 is a flowchart illustrating a flow of photography preparation processing of a still image photography. This process of performed after the shutter button is half pressed and the signal S1ON is input to the CPU 40. Even in this case, the signal charge accumulated in the phase difference CCD 17 is sequentially read at a predetermined frame rate as the voltage signal (image signal) depending on the signal charge, and is sequentially input to the digital signal processing unit 63 through the analog signal processing unit 60, the A/D converter 61, and the image input controller 62. Accordingly, the left-eye image data and the right-eye image data are sequentially generated.

The CPU 40 drives the photography lens 14 and the diaphragm 16 to the same position as that during the live-view image photography and then stops the driving (step S30), and sets the parallax correction quantity at this time to 0 as the initial setting (step S31).

The CPU 40 performs the phase difference AF to acquire the focusing position through movement of the focus lens. The parallax correction quantity calculation unit 67 determines where or not the focus lens is moved in the phase difference AF processing (step S32).

If the focus lens is moved ("YES" in step S32), it means that the object that is focused is changed. In this case, the parallax correction quantity calculation unit 67 calculates the parallax correction quantity from the left-eye image data and the right-eye image data (step S33).

The parallax correction unit 68 makes the VRAM 50 output the left-eye image data and the right-eye image data, and moves at least one of the left-eye image data and the right-eye image data in the left and right directions based on the parallax correction quantity that is calculated by the parallax correction quantity calculation unit 67 to input the image data to the 3D image signal processing unit 64 (step S34).

If the focus lens is not moved ("NO" in step S32), it means that the object that is focused is not changed. In this case, the parallax correction unit 68 makes the VRAM 50 output the left-eye image data and the right-eye image data, and moves at least one of the left-eye image data and the right-eye image data in the left and right directions based on the parallax correction quantity of the just previous frame (the parallax correction quantity that the parallax correction quantity calculation unit 67 calculated just previously, or if the parallax correction quantity calculation unit 67 has not calculated the parallax correction quantity, the parallax correction quantity initially set in step S31) to input the image data to the 3D image signal processing unit 64 (step S35). Accordingly, if the parallax correction quantity is 0, the left-eye image data and the right-eye image data are not moved.

The 3D image signal processing unit 64 generates luminance/chrominance signals with respect to the left-eye image data and the right-eye image data that have been moved in the left and right directions by the parallax correction unit 68, and outputs the luminance/chrominance signals to the liquid crystal monitor 28 through the video encoder 66. On the liquid crystal monitor 28, the parallax barrier is generated, and the paper-formed image pieces with the left-eye image data and the right-eye image data are alternately arranged and displayed on the image display surface that is the lower layer of the parallax barrier (step S36).

The CPU 40 determines whether or not the AF is terminated, that is, whether or not the focusing position has been determined from the operation unit 48 (step S37). If the focusing position has not been determined ("NO" in step S37), the CPU 40 repeatedly performs the processing in steps S32 to S36. If the focusing position has been determined ("YES" in step S37), this processing is terminated.

Through this, even during the AF operation, the parallax quantity of the image that is imaged on the main pixels and the sub-pixels of the phase difference CCD 17 is corrected so that the parallax quantity of the main object becomes constant, and the image is displayed in real time.

The CPU 40 moves the focusing position of the focus lens to the determined focusing position. In addition, the AE/AWB detection unit 44 performs the AE processing.

If the shutter button is fully pressed, a signal S20N is input to the CPU 40, and the CPU 40 starts the photography and recording process. That is, the CPU 40 exposes the phase difference CCD 17 with the determined shutter speed and diaphragm value based on the photometry result.

The CPU 40 reads the signal charge from the pixel selected from pixels A to D through the CCD driving unit 33. The image data for two sheets output from the pixels selected from the main pixels and the pixels selected from the sub-pixels of the phase difference CCD 17 is introduced into the VRAM 50 through the analog signal processing unit 60, the A/D converter 61, and the image input controller 62, is converted into luminance/chrominance signals through the 3D image signal processing unit 64, and then is stored in the VRAM 50. The left-eye image data stored in the VRAM 50 is applied to the compression extension processing unit 65 to be compressed according to a predetermined compression format (for example, JPEG form), and then is stored in the VRAM 50.

An MP file is generated from the compression data for two sheets recorded in the VRAM 50, and the MP file is recorded in the recording medium 54 through the media controller 52. Through this, the 3D image is photographed and recorded.

According to this embodiment, even in the case where the focus lens is moved to change the focusing position and the focus point during the display of the AF operation to move the focus lens, the parallax quantity of the left-eye image and the right-eye image of the main object can be constantly maintained, and thus the discomfort of the photographer can be reduced to realize comfortable viewing of the 3D image.

In this embodiment, since the parallax correction quantity is calculated based on the distance of the corresponding point, the parallax correction quantity can be calculated even in the stage when the focusing position does not become clear (that is, before the AF processing is terminated).

Figure 11:
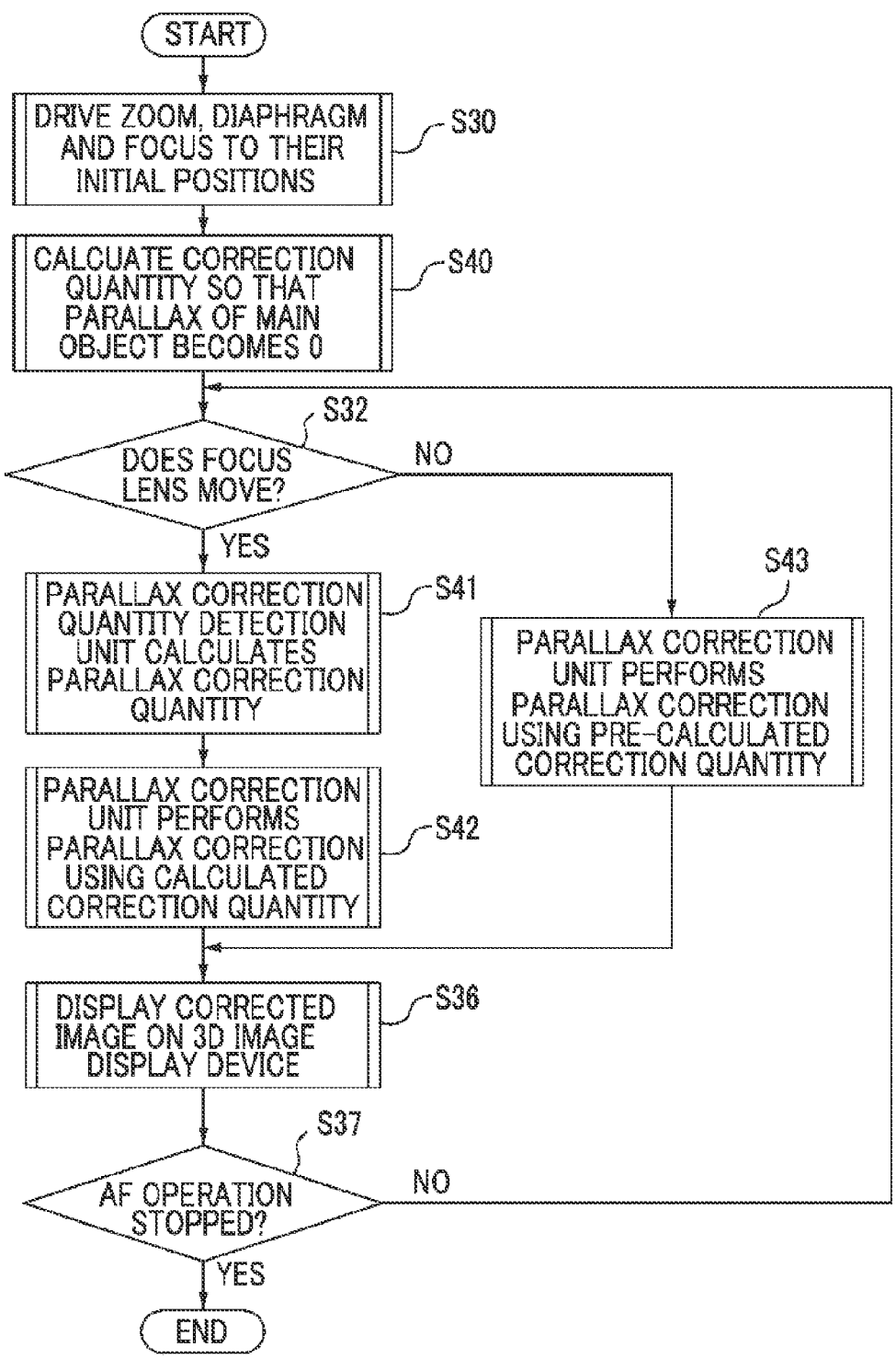
FIG. 11 is a flowchart of another example of photography preparation processing of the single-eye stereoscopic image capturing device 2.

In this embodiment, although the parallax correction quantity when the photography lens 14 is in the initial position is set to 0 as the initial setting (step S31), the initial set value of the parallax correction quantity is not limited thereto. FIG. 11 is a flowchart illustrating a flow of AF processing in the case where the initial setting value of the parallax correction quantity is set to a value whereby the parallax quantity of the main object becomes 0.

The same reference numerals are given for the same processes as those in FIG. 10, and the detailed explanation thereof will not be repeated.

The CPU 40 drives the photography lens 14 and the diaphragm 16 to the same position as that during the live-view image photography and then stops the driving (step S30).

The CPU 40 detects the main object (in this embodiment, the object that is positioned in the center of the screen). The parallax correction quantity calculation unit 67 calculates the value whereby the parallax quantity of the main object of the left-eye image and the right-eye image becomes 0, and sets the calculated parallax correction quantity as the initially set parallax correction quantity (step S40). Accordingly, in this case, the correction of the parallax quantity is performed so that the main object becomes 0 since the movement of the focus lens.

The CPU 40 performs the AF to acquire the focusing position through movement of the focus lens. In the phase difference AF processing, the parallax correction quantity calculation unit 67 determines whether or not the focus lens is moved (step S32).

If the focus lens is moved ("YES" in step S32), the parallax correction quantity calculation unit 67 calculates the parallax correction quantity from the left-eye image data and the right-eye image data. Further, the parallax correction quantity calculation unit 67 calculates the final parallax correction quantity by adding the calculated parallax correction quantity to the parallax correction quantity initially set in step S40 (step S41).

The parallax correction unit 68 moves at least one of the left-eye image data and the right-eye image data acquired from the VRAM 50 in the left and right directions based on the parallax correction quantity that is calculated by the parallax correction quantity calculation unit 67 in step S41 to input the image data to the 3D image signal processing unit 64 (step S42).

If the focus lens is not moved ("NO" in step S32), the parallax correction unit 68 moves at least one of the left-eye image data and the right-eye image data acquired from the VRAM 50 in the left and right directions based on the parallax correction quantity of the just previous frame (the parallax correction quantity that the parallax correction quantity calculation unit 67 calculated just previously, or if the parallax correction quantity calculation unit 67 has not calculated the parallax correction quantity, the parallax correction quantity initially set in step S40) to input the image data to the 3D image signal processing unit 64 (step S43).

The luminance/chrominance signals are generated from the left-eye image data and the right-eye image data that have been moved in the left and right directions by the parallax correction unit 68, and are output to the liquid crystal monitor 28. On the liquid crystal monitor 28, the parallax barrier is generated, and the paper-formed image pieces with the left-eye image data and the right-eye image data are alternately arranged and displayed on the image display surface that is the lower layer of the parallax barrier (step S36).

The CPU 40 determines whether or not the AF is terminated, that is, whether or not the focusing position has been determined from the operation unit 48 (step S37). If the focusing position has not been determined ("NO" in step S37), the CPU 40 repeatedly performs the processing in steps S32 to S36. If the focusing position has been determined ("YES" in step S37), this processing is terminated.

Through this, even during the AF operation, the parallax quantity of the right-eye image and the left-eye image can be constantly maintained.

According to this embodiment, it is exemplified that the AF is performed as the photography preparation processing of the still image. However, the present invention can be applied to a case where the phase difference AF is performed as the photography processing of the moving image (including the live-view image) and the focus lens is not moved during the moving image photography.

Third Embodiment

In the first embodiment of the present invention, the parallax quantity of the main object of the right-eye image and the left-eye image is calculated based on the amount of slip of the corresponding point between the right-eye image data and the left-eye image data. However, the method of calculating the parallax quantity of the main object of the right-eye image and the left-eye image is not limited thereto.

The third embodiment of the present invention corresponds to the calculation of the parallax quantity of the main object of the right-eye image and the left-eye image from the movement amount of the focus lens. Hereinafter, a single-eye stereoscopic image capturing device 3 according to the third embodiment of the present invention will be described. The same reference numerals are used for the same parts as the first embodiment, and the explanation thereof will not be repeated.

[Overall Configuration of Imaging Device]

Figure 12:
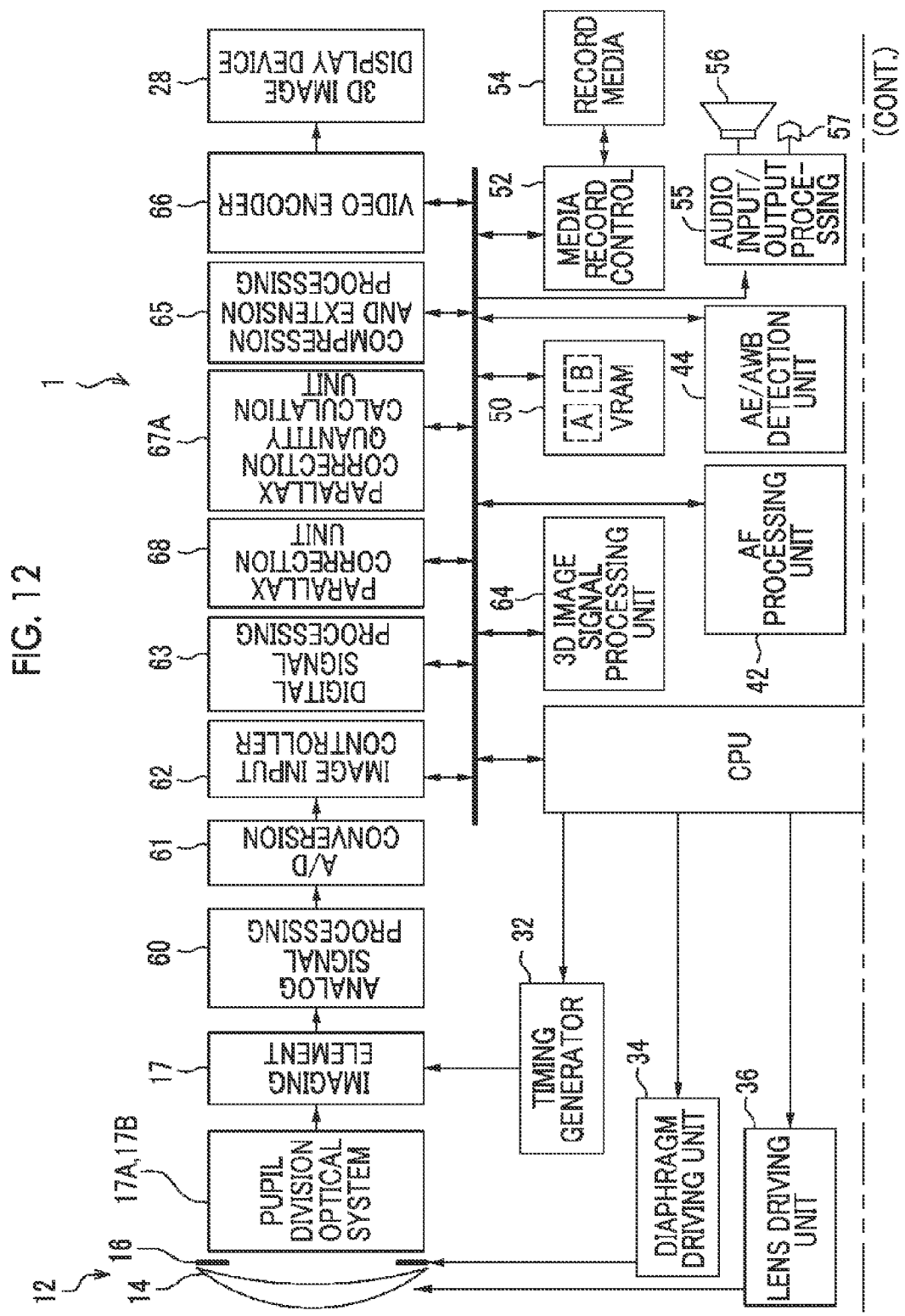
FIG. 12 is a block diagram of the internal configuration of a single-eye stereoscopic image capturing device 3.

FIG. 12 is a block diagram of a single-eye stereoscopic image capturing device 3 according to a third embodiment of the present invention.

A parallax correction quantity calculation unit 67 calculates the change of the parallax quantity of the right-eye image and the left-eye image which are displayed on the display screen of the liquid crystal monitor 28 among the right-eye image, the left-eye image, and the phase difference AF which are continuously displayed on the display screen of the liquid crystal monitor 28. At this time, the reference is the case where the parallax quantity of a main object is 0. That is, the parallax correction quantity calculation unit 67 calculates the parallax correction quantity that is necessary to make the parallax quantity 0 by obtaining the parallax quantity of the main object of the right-eye image and the left-eye image which are displayed on the display screen of the liquid crystal monitor 28. Here, the main object may indicate an object that is in the center of the AF area, an object that is in the center of the screen, a face of a person or a pet that is detected by a face detection unit (not illustrated), or an object designated by an input from the operation unit 48. Further, since the method of detecting a face of a person or a pet through the face detection unit has already been known, the description thereof will not be repeated. The calculated parallax correction quantity is output to the parallax correction unit 68.

The parallax quantity of the main object of the right-eye image and the left-eye image which are displayed on the display screen of the liquid crystal monitor 28 is calculated based on an amount of movement of the focus lens. In a recording area of the parallax correction quantity calculation unit 67A, the correlation between the movement quantity from the initial position of the focus lens and the change amount of the focusing position is recorded. Accordingly, the parallax correction quantity calculation unit 67A can calculate how and to what extent the focusing position has been changed (hereinafter referred to as a "change amount of a focusing position") from the movement quantity at the initial position of the focus lens.

Further, in the recording area of the parallax correction quantity calculation unit 67A, the correlation between the focusing position and the parallax correction quantity (see FIGS. 13, 16, and 17) is recorded. The parallax correction quantity calculation unit 67A determines the parallax correction quantity based on graphs showing the change amount of the focusing position calculated from the movement amount at the initial position of the focus lens and the correlation between the focusing position and the parallax correction amount. For example, in the case of using the correlation between the focusing position and the parallax correction quantity shown in FIG. 13, if the focusing position is moved as long as a toward the front, the parallax correction quantity calculation unit 67A determines "b toward the front" as the parallax correction quantity.

Figure 13:
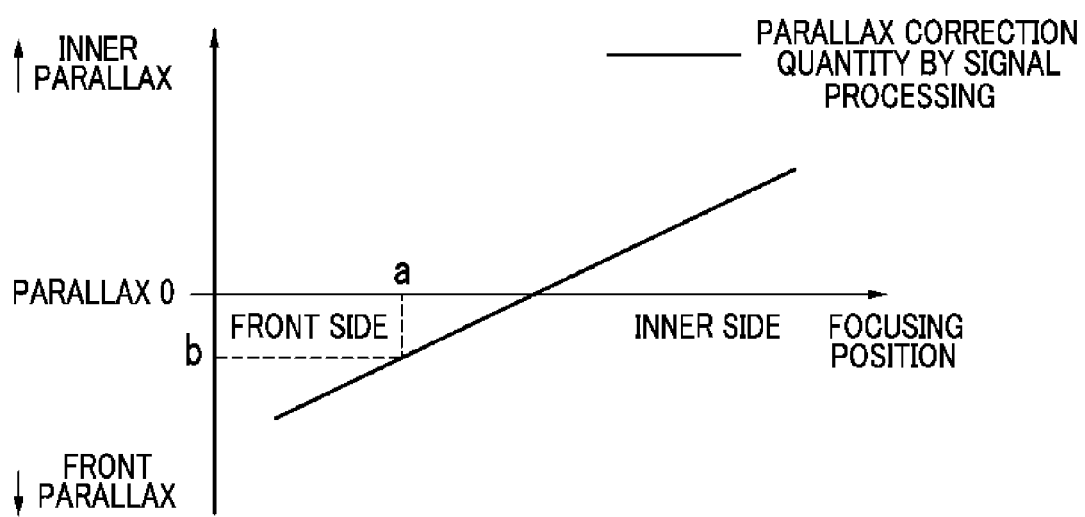
FIG. 13 illustrates an example of a graph showing the correlation between a focusing position and a parallax correction quantity.

FIG. 13 is an example of a graph indicating the correlation between the focusing position and the parallax correction quantity. That is, FIG. 13 is a graph indicating the correlation between the focusing position and the parallax correction quantity in the case where the focal length is within a predetermined range around the center and an F value is within a predetermined range that is considered as an appropriate photography range (that is, the application range of the graph of FIG. 13 is a certain range in which the focal length and the F value are around a predetermined value). The correlations between the focusing position and the parallax correction quantity are in proportional relations, and as the focusing position is moved from the front side to the back side, the parallax correction quantity from the front side to the back side is increased in a constant degree of leaning.

Figure 14:
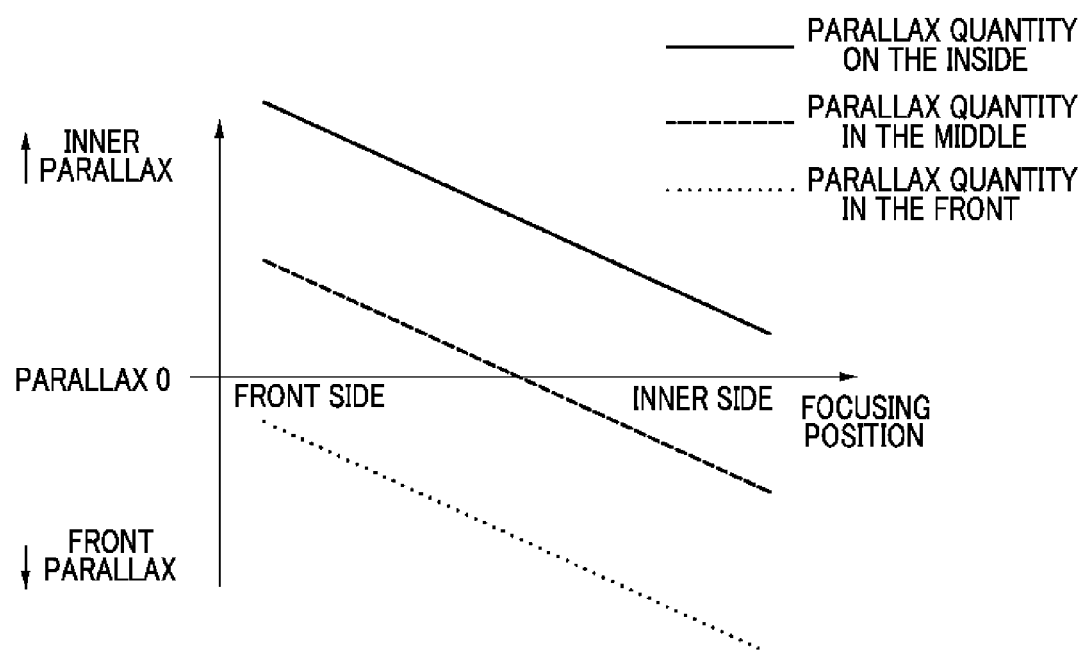
FIG. 14 is a graph illustrating a parallax quantity when the focusing position is moved from front side to the back side.
Figure 20A:
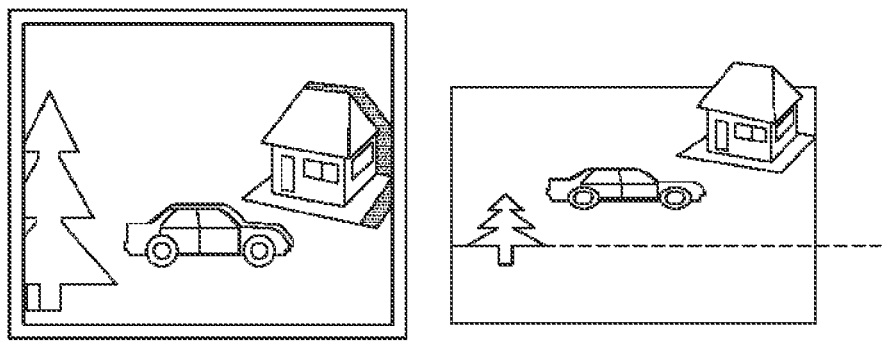
FIGS. 20A to 20C illustrate display examples to show the change of a parallax quantity when the focusing position is moved from front side to the back side, in which the focusing position is moved to the back side in of FIGS. 20A to 20C.
Figure 20B:
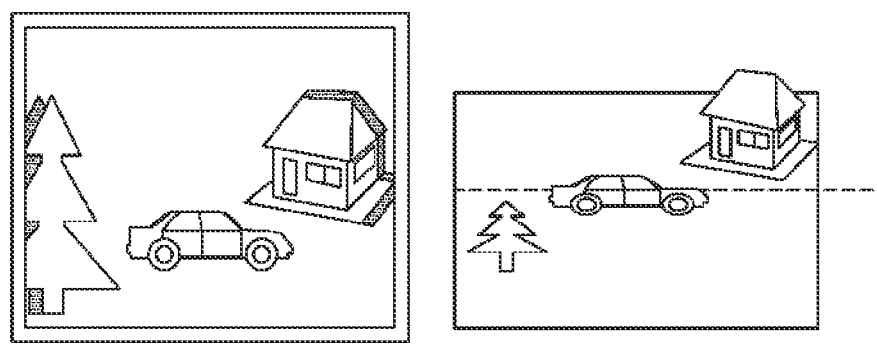
Figure 20C:
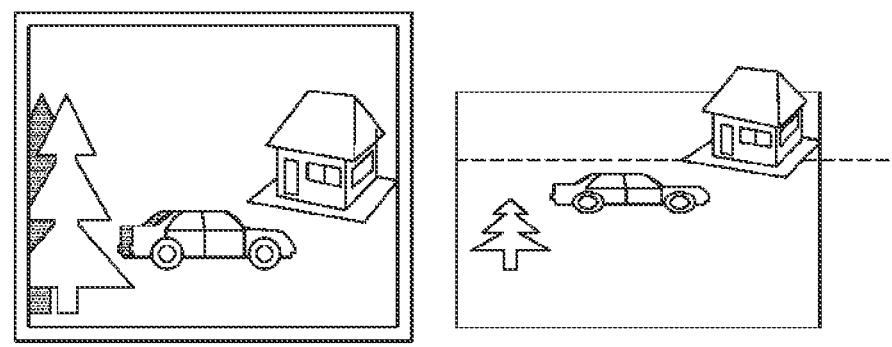

The graph shown in FIG. 13 is set to eliminate the parallax quantity of the right-eye image and the left-eye image due to the change of the focusing position. If the focusing position is moved from the front side to the back side as shown in FIGS. 20A to 20C, the position in which the parallax quantity becomes 0 slips off toward the back, and thus the parallax quantity of a tree of the right-eye image and the left-eye image is moved toward the front in the constant ratio. That is, the tree that is displayed on the liquid crystal monitor 28 appears to jump out in the constant ratio. This correlation is shown in the graph of FIG. 14. In FIG. 14, if the focusing position is moved from the front side to the back side regardless of where the object is, the parallax quantity toward the front side is increased in the constant ratio.

Figure 15:
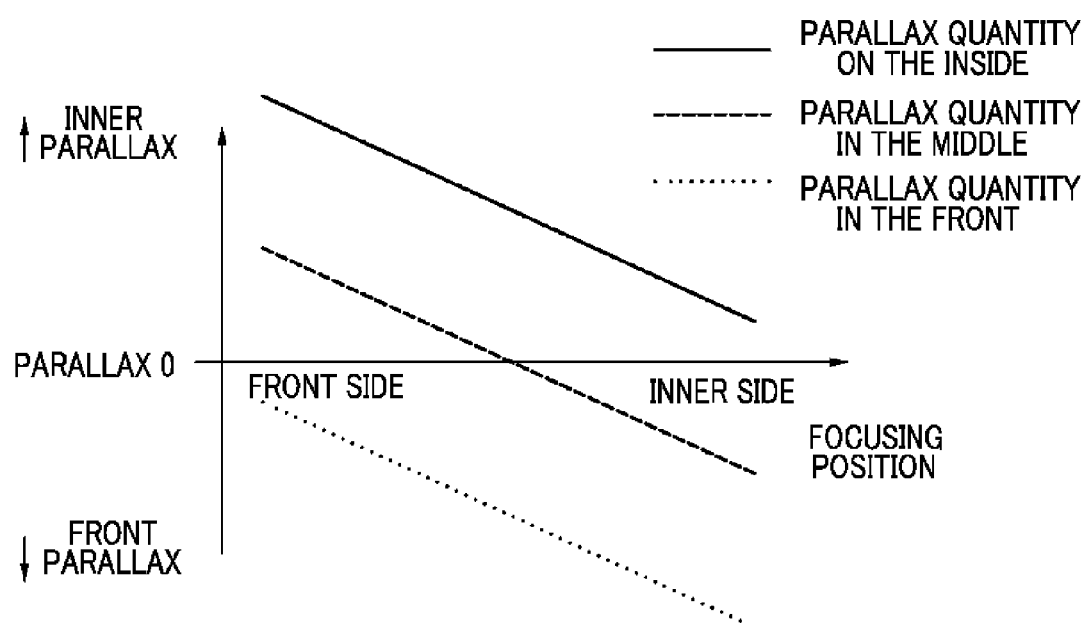
FIG. 15 is a diagram explaining that a parallax quantity becomes constant if the graph shown in FIG. 13 is applied to the graph shown in FIG. 14.

The graph shown in FIG. 13 and the graph shown in FIG. 14 have different agreement only, but have the same leaning. Due to this, by applying the graph shown in FIG. 13 to the graph shown in FIG. 14, a graph shown in FIG. 15 is obtained. That is, even if the focusing position is moved from the front side to the back side regardless of where the object is, the parallax quantity of the right-eye image and the left-eye image always becomes constant. Further, the parallax quantity of the object in the focusing position, that is, the main object of the right-eye image and the left-eye image always becomes 0.

Through this, the parallax correction quantity can be calculated so that the parallax correction quantity of the main object always becomes 0.

Figure 16:
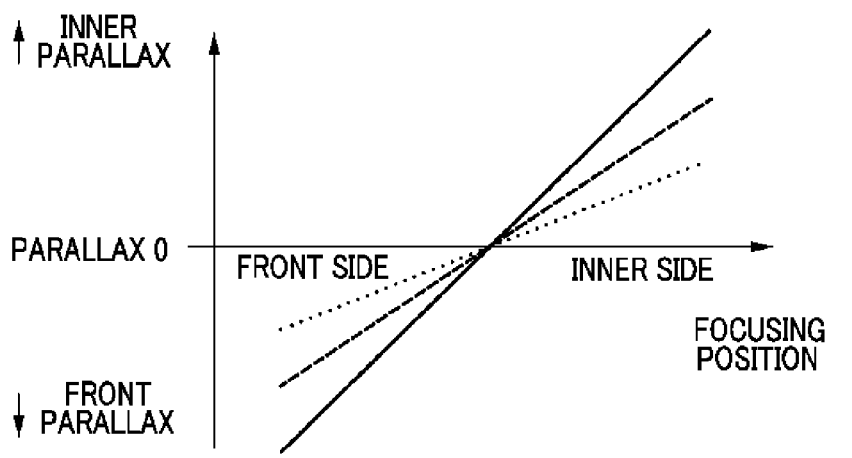
FIG. 16 illustrates an example of a graph showing the correlation between a focusing position and a parallax correction quantity.
Figure 17:
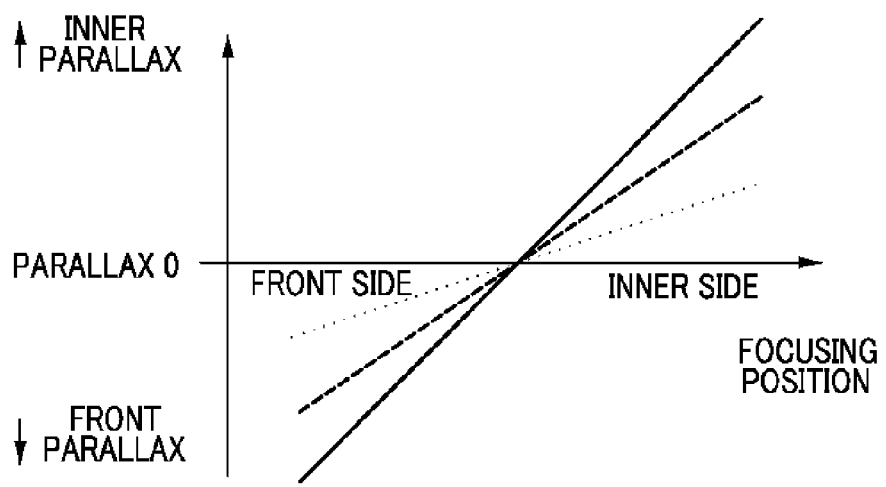
FIG. 17 illustrates an example of a graph showing the correlation between a focusing position and a parallax correction quantity.

In the foregoing description, for easy understanding, the explanation is made using the graph (FIG. 13) indicating the correlation between the focusing position and the parallax correction quantity in the case where the focal length is within a predetermined range neighboring the middle and the F value is within a predetermined range that is considered as an appropriate photography range. However, the correlation between the focusing position and the parallax correction quantity is really changed by the focal length or the F value. FIG. 16 is a graph showing the correlation between the focusing position and the parallax correction quantity for various focal lengths, and FIG. 17 is a graph showing the correlation between the focusing position and the parallax correction quantity for various F values. In the same manner as in FIG. 13, the application ranges of the graphs of FIGS. 16 and 17 are certain ranges in which the focal length and the F value are around a predetermined value.

as the zoom lens is moved and the position of the zoom lens (zoom position) goes to the distance side, the depth of field of the object becomes shallow, and the parallax quantity occurs easily. Accordingly, in order to calculate the appropriate parallax correction quantity depending on the focal length, as the focal length goes to the distance side, it is necessary to increase the change amount of the parallax correction quantity to the change amount when the focusing position is changed (slope on the graph). Accordingly, the slope on the graph showing the correlation between the focal position and the parallax correction quantity is changed as shown in FIG. 16 by the focal length.

As the F value is small, that is, as the object is bright, the depth of field of the object becomes shallow, and the parallax quantity occurs easily. Accordingly, in order to calculate the appropriate parallax correction quantity depending on the brightness of the object, as the F value becomes smaller, it is necessary to increase the change amount of the parallax correction quantity to the change amount when the focusing position is changed (slope on the graph). Accordingly, the slope on the graph showing the correlation between the focal position and the parallax correction quantity is changed as shown in FIG. 17 by the F value.

Even the graphs showing the correlation between the focusing position and the parallax correction quantity shown in FIGS. 16 and 17 are recorded in the recording area of the parallax correction quantity calculation unit 67A. Although three graphs are exemplified in FIGS. 16 and 17, more graphs with different focal lengths or F values may be recorded.

The parallax correction quantity calculation unit 67A acquires the focal length or the brightness of the object, and determines which graph is to be used among a plurality of graphs recorded in the recording area as the graphs indicating the correlation between the focusing position and the parallax correction quantity. Through this, regardless of the condition of the object or the optical condition, the parallax correction quantity can be calculated so that the parallax quantity of the object always becomes 0.

Further, the recording of the correlation between the focusing position and the parallax correction quantity is not limited to the graphs as shown in FIGS. 13, 16, and 17, but a table that the correlation between the focusing position and the parallax correction quantity is expressed in a list form may be recorded.

[Explanation of Operation of Imaging Device]

Next, the operation of the single-eye stereoscopic image capturing device 3 will be described. This imaging processing is controlled by the CPU 40. A program to cause the CPU 40 to execute the imaging processing is recorded in the program storage unit in the CPU 40.

FIG. 18 is a flowchart illustrating a flow of photographing and displaying processes of a live-view image of the single-eye stereoscopic image capturing device 3. Since the difference with the photography processing of the live-view image of the single-eye stereoscopic image capturing device 1 is step S50 only, step S50 will be described.

The parallax correction quantity calculation unit 67 determines where or not the focusing position is changed by the continuous AF (step S16). If the focusing position is changed ("YES" in step S16), it means that the focus lens has moved and the object that is focused, that is, the focus point, has been changed.

In this case, the parallax correction quantity calculation unit 67 calculates the parallax correction quantity based on the movement amount of the focus lens (step S50). Hereinafter, the processing in step S50 will be described in detail.

First, the parallax correction quantity calculation unit 67 acquires the movement amount from the initial position of the focus lens, the focal length (this is calculated by the zoom position), and the F value through the CPU 40.

Next, the parallax correction quantity calculation unit 67 determines which graph is to be used among a plurality of graphs recorded in the recording area as the graphs indicating the correlation between the focusing position and the parallax correction quantity based on the focal length and the F value.

Then, the parallax correction quantity calculation unit 67 calculates the change amount of the focusing position based on the movement amount from the initial position of the focus lens. The change amount of the focusing position is the change amount between the focusing position before step S50 is performed and the focusing position after the focus lens is moved. The parallax correction quantity is calculated based on the result of the calculation and the graph that indicates the correlation between the focusing position and the parallax correction quantity.

In step S50, if it is intended to obtain the change amount of the focusing position in the state where the focus lens has been moved to the initial position, the movement amount from the position of the focus lens or the movement amount from the initial position may be calculated.

Through this, the parallax quantity of the image that is imaged on the main pixels and the sub-pixels of the phase difference CCD 17 is corrected so that the parallax quantity of the main object becomes constant depending on the condition of the object or the optical condition, and is displayed in real time.

In this embodiment, the parallax quantity of the right-eye image and the left-eye image becomes constant regardless of the condition of the object or the optical object and regardless of the movement of the focus lens, and thus the discomfort of the photographer can be reduced.

In this embodiment, the photography and display of the live-view image has been described as an example. However, as in the first embodiment, the present invention can be applied to a case where the right-eye image data and the left-eye image data are continuously acquired and the continuous AF is performed, for example, in the case of photographing the moving image.

In this embodiment, a graph that indicates the correlation between the focusing position and the parallax correction quantity is recorded. However, the parallax correction quantity may be directly obtained rather than the movement amount of the focus lens through recording of the graph that indicates the relationship between the movement amount of the focus lens and the parallax correction quantity.

In this embodiment, the parallax correction quantity rather than the change amount of the focusing position is calculated by obtaining the change amount of the focusing position rather than the movement amount of the focus lens. However, if it is possible to calculate the change amount of the focusing position, the calculation of the movement amount of the focus lens is not essential.

In the first to third embodiments, the left-eye image data and the right-eye image data, after being moved in the left and right directions by the parallax correction unit 68, are output to the liquid crystal monitor 28 through the 3D image signal processing unit 64 and the video encoder. However, the left-eye image data and the right-eye image data, after being moved in the left and right directions by the parallax correction unit 68, may be output to and recorded in the recording medium 54, recording part (not illustrated) in the single-eye stereoscopic image capturing device, and external recording part connected to the single-eye stereoscopic image capturing device. Through this, even in the case of displaying the 3D image through the single-eye stereoscopic image capturing device or other display part, the parallax quantity of the left-eye image and the right-eye image is maintained constant without depending on the movement of the focus lens, and thus the discomfort of the viewer can be reduced.

In the first to third embodiments, it is exemplified that the CCD is used as the imaging element. However, the imaging element is not limited to the CCD, and the present invention can be applied to other image sensors such as CMOS.

Figure 19:
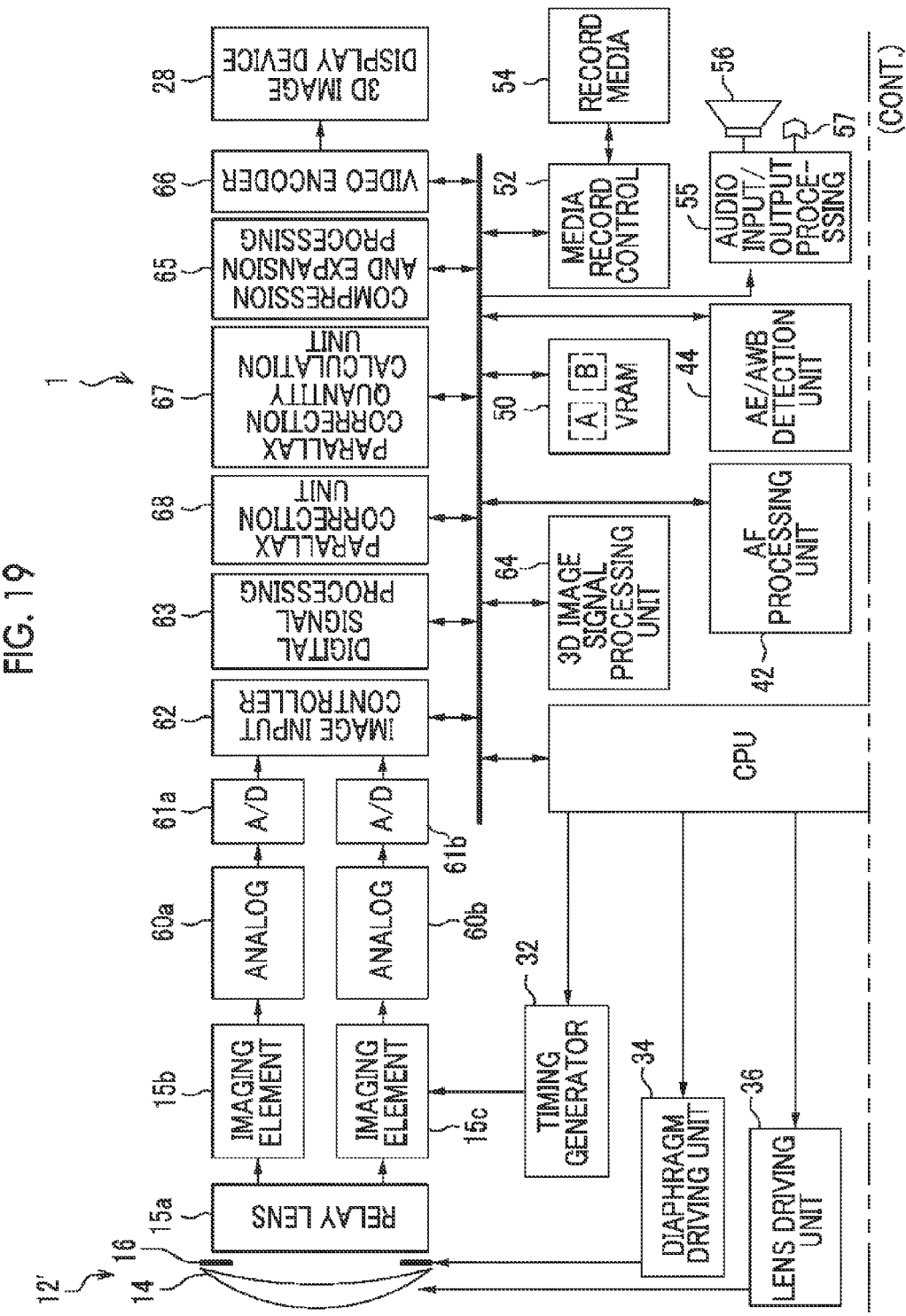
FIG. 19 is a block diagram of the internal configuration of a single-eye stereoscopic image capturing device according to a modified example.

In the first to third embodiments, the single-eye stereoscopic image capturing device which divides the light flux through the light shield members 17A and 17B installed on the side of the micro lens L of the phase difference CCD 17 has been described as an example. However, as shown in FIG. 19, a single-eye stereoscopic image capturing device using a photography lens 12' which includes a relay lens that divides the light flux is also applicable. Further, by providing one micro lens with respect to two pixels (main pixel and sub-pixel), the light flux that is incident to each pixel may be limited.

What is claimed is:

1. A single-eye stereoscopic image capturing device comprising:
    a photographic optical system including a focus lens;
    pupil division part for dividing light flux that has passed through the photographic optical system into a plurality of light fluxes;
    imaging part for acquiring a left-eye image and a right-eye image by receiving the plurality of light fluxes divided by the pupil division part;
    focus lens driving part for moving a focusing position of the focus lens;
    parallax correction quantity calculation part for calculating a parallax correction quantity for constantly maintaining a parallax quantity of a main object of the left-eye image and the right-eye image when the focusing position of the focus lens is moved by the focus lens driving part;
    parallax correction part for performing parallax correction of the left-eye image and the right-eye image by moving at least one of the left-eye image and the right-eye image in left and right directions by the parallax correction quantity if the parallax correction quantity is calculated by the parallax correction quantity calculation part; and
    output part for outputting the left-eye image and the right-eye image, which have been acquired by the imaging part, or the left-eye image and the right-eye image, of which the parallax correction has been performed by the parallax correction part.

2. The single-eye stereoscopic image capturing device according to claim 1, further comprising display part for recognizably displaying the left-eye image and the right-eye image as a 3D image,
    wherein the output part outputs the left-eye image and the right-eye image, which have been acquired by the imaging part, or the left-eye image and the right-eye image, of which the parallax correction has been performed by the parallax correction part, to the display part.

3. The single-eye stereoscopic image capturing device according to claim 1, further comprising first recording part for recording the left-eye image and the right-eye image,
    wherein the output part outputs the left-eye image and the right-eye image, which have been acquired by the imaging part, or the left-eye image and the right-eye image, of which the parallax correction has been performed by the parallax correction part, to the first recording part.

4. The single-eye stereoscopic image capturing device according to claim 2, further comprising first recording part for recording the left-eye image and the right-eye image,
    wherein the output part outputs the left-eye image and the right-eye image, which have been acquired by the imaging part, or the left-eye image and the right-eye image, of which the parallax correction has been performed by the parallax correction part, to the first recording part.

5. The single-eye stereoscopic image capturing device according to claim 1, wherein the parallax correction quantity calculation part calculates the parallax correction quantity whereby the parallax quantity of the main object always becomes 0.

6. The single-eye stereoscopic image capturing device according to claim 2, wherein the parallax correction quantity calculation part calculates the parallax correction quantity whereby the parallax quantity of the main object always becomes 0.

7. The single-eye stereoscopic image capturing device according to claim 3, wherein the parallax correction quantity calculation part calculates the parallax correction quantity whereby the parallax quantity of the main object always becomes 0.

8. The single-eye stereoscopic image capturing device according to claim 4, wherein the parallax correction quantity calculation part calculates the parallax correction quantity whereby the parallax quantity of the main object always becomes 0.

9. The single-eye stereoscopic image capturing device according to claim 1, wherein the parallax correction quantity calculation part detects corresponding points of the main object from the left-eye image and the right-eye image, respectively, and calculates the parallax correction quantity whereby a deviation quantity between the detected corresponding point of the left-eye image and the detected corresponding point of the right-eye image is constantly maintained.

10. The single-eye stereoscopic image capturing device according to claim 2, wherein the parallax correction quantity calculation part detects corresponding points of the main object from the left-eye image and the right-eye image, respectively, and calculates the parallax correction quantity whereby a deviation quantity between the detected corresponding point of the left-eye image and the detected corresponding point of the right-eye image is constantly maintained.

11. The single-eye stereoscopic image capturing device according to claim 3, wherein the parallax correction quantity calculation part detects corresponding points of the main object from the left-eye image and the right-eye image, respectively, and calculates the parallax correction quantity whereby a deviation quantity between the detected corresponding point of the left-eye image and the detected corresponding point of the right-eye image is constantly maintained.

12. The single-eye stereoscopic image capturing device according to claim 5, wherein the parallax correction quantity calculation part detects corresponding points of the main object from the left-eye image and the right-eye image, respectively, and calculates the parallax correction quantity whereby a deviation quantity between the detected corresponding point of the left-eye image and the detected corresponding point of the right-eye image is constantly maintained.

13. The single-eye stereoscopic image capturing device according to claim 5, wherein the parallax correction quantity calculation part detects corresponding points of the main object from the left-eye image and the right-eye image, respectively, and calculates the parallax correction quantity whereby a deviation quantity between the detected corresponding point of the left-eye image and the detected corresponding point of the right-eye image is constantly maintained.

14. The single-eye stereoscopic image capturing device according to claim 1, further comprising movement quantity calculation part for calculating a movement quantity of the focusing position of the focus lens when the focusing position of the focus lens is moved by the focus lens driving part,
   wherein the parallax correction quantity calculation part calculates the parallax correction quantity based on the movement quantity of the focusing position of the focus lens that is calculated by the movement quantity calculation part.

15. The single-eye stereoscopic image capturing device according to claim 1, further comprising:
   focusing position acquisition part for acquiring the focusing position based on the position of the focus lens; and
   second recording part for recording correlation between the focusing position and the parallax correction quantity,
   wherein the parallax correction quantity calculation part calculates the parallax correction quantity based on the focusing position acquired by the focusing position acquisition part and the correlation between the focusing position recorded in the second recording part and the parallax correction quantity.

16. The single-eye stereoscopic image capturing device according to claim 15, further comprising:
   a diaphragm adjusting an amount of light that is incident to the imaging part through the photographic optical system; and
   diaphragm value detection part for detecting a diaphragm value of the diaphragm,
   wherein a plurality of records of the correlation between the focusing position and the parallax correction quantity are made in the second recording part according to the detected diaphragm value of the diaphragm, and
   the parallax correction quantity calculation part determines the correlation between the focusing position and the parallax correction quantity, which is used to calculate the parallax correction quantity, among the plurality of recorded correlations between the focusing position and the parallax correction quantity in the second recording part based on the diaphragm value of the diaphragm calculated by the diaphragm value detection part.

17. The single-eye stereoscopic image capturing device according to claim 15, wherein the photographic optical system comprises a zoom lens, and
   focal length detection part for detecting a focal length in a position of the zoom lens is provided,
   a plurality of records of the correlation between the focusing position and the parallax correction quantity are made in the second recording part according to the focal length, and
   the parallax correction quantity calculation part determines the correlation between the focusing position and the parallax correction quantity, which is used to calculate the parallax correction quantity, among the plurality of recorded correlations between the focusing position and the parallax correction quantity in the second recording part based on the focal length detected by the focal length detection part.

18. The single-eye stereoscopic image capturing device according to claim 1, further comprising automatic focusing part for moving the focusing position of the focus lens through the focus lens driving part so that the main object is focused on based on the left-eye image and the right-eye image acquired by the imaging part,
   wherein the imaging part continuously acquires the left-eye image and the right-eye image, and
   the automatic focusing part continuously moves the focusing position of the focus lens while the imaging part continuously acquires the left-eye image and the right-eye image.

19. The single-eye stereoscopic image capturing device according to claim 14, further comprising:
   automatic focusing part for moving the focusing position of the focus lens through the focus lens driving part so that the main object is focused on based on the left-eye image and the right-eye image acquired by the imaging part; and
   photography instructions input part for inputting photography instructions,
   wherein the imaging part acquires the left-eye image and the right-eye image by one sheet when the photography instructions are input by the photography instructions input part, and
   the automatic focusing part moves the focusing position of the focus lens before the imaging part acquires the left-eye image and the right-eye image by one sheet.

20. The single-eye stereoscopic image capturing device according to claim 1, wherein the parallax correction part moves the left-eye image on the right side and the right-eye image on the left side or performs parallax correction by moving the left-eye image on the right side and the right-eye image on the left side when the focusing position of the focus lens is moved by the focus lens driving part in a direction where the focusing position is near, and
   the parallax correction part moves the left-eye image on the left side and the right-eye image on the right side or performs parallax correction by moving the left-eye image on the left side and the right-eye image on the right side when the focusing position of the focus lens is moved by the focus lens driving part in a direction where the focusing position is far.

\* \* \* \* \*